(12) United States Patent
Rosedale et al.

(10) Patent No.: US 7,401,048 B2
(45) Date of Patent: Jul. 15, 2008

(54) SYSTEM AND METHOD FOR TRADE SETTLEMENT TRACKING AND RELATIVE RANKING

(75) Inventors: Matthew P. Rosedale, New York, NY (US); Warren Master, Haworth, NJ (US); Thomas Campfield, Stamford, CT (US); John Phinney, Wilton, CT (US)

(73) Assignee: JPMorgan Chase Bank, N.A., New York, NY (US)

( * ) Notice: Subject to any disclaimer, the term of this patent is extended or adjusted under 35 U.S.C. 154(b) by 45 days.

(21) Appl. No.: 10/157,439

(22) Filed: May 30, 2002

(65) Prior Publication Data

US 2003/0046219 A1 Mar. 6, 2003

Related U.S. Application Data

(60) Provisional application No. 60/295,397, filed on Jun. 1, 2001.

(51) Int. Cl.
G06Q 40/00 (2006.01)
(52) U.S. Cl. .......................................... 705/37; 705/35
(58) Field of Classification Search .................... 705/37
See application file for complete search history.

(56) References Cited

U.S. PATENT DOCUMENTS

| | | | |
|---|---|---|---|
| 3,653,480 A | 4/1972 | Yamamoto et al. |
| 4,205,780 A | 6/1980 | Burns |
| 4,264,808 A | 4/1981 | Owens et al. |
| 4,321,672 A | 3/1982 | Braun et al. |
| 4,396,985 A | 8/1983 | Ohara |
| 4,617,457 A | 10/1986 | Myers |
| 4,672,377 A | 6/1987 | Murphy |
| 4,700,055 A | 10/1987 | Kashkashian, Jr. |
| 4,752,877 A | 6/1988 | Roberts et al. |
| 4,797,913 A | 1/1989 | Kaplan |

(Continued)

FOREIGN PATENT DOCUMENTS

EP 1014318 6/2000

(Continued)

OTHER PUBLICATIONS

Joanna Wrighton, Keeping Control of Your Assets, May 1996, Global Investor, pp. 1-8.*

(Continued)

*Primary Examiner*—Kambiz Abdi
*Assistant Examiner*—Jennifer Liversedge
(74) *Attorney, Agent, or Firm*—Hunton & Williams LLP

(57) ABSTRACT

A distributed computer system that enables end users to evaluate a broker's trade settlement performance by market and across multiple markets in terms of how many of the broker's trades failed. Trades are defined as having failed when the actual settle date exceeds the date on which the trade should have settled. The system analyzes trade settlement statistics about each broker within the context of a selected broker peer group, and ranks and compares a broker's settlement performance relative to the peer group. The system also ranks the brokers based on a set of metrics relative to the selected peer group. A broker's peer group is defined in terms of the broker's relative size within the trade universe as determined by trade count.

16 Claims, 21 Drawing Sheets

U.S. PATENT DOCUMENTS

| | | | |
|---|---|---|---|
| 4,799,156 | A | 1/1989 | Shavit |
| 4,812,628 | A | 3/1989 | Boston |
| 4,823,264 | A | 4/1989 | Deming |
| 4,948,174 | A | 8/1990 | Thomson et al. |
| 4,974,878 | A | 12/1990 | Josephson |
| 4,988,849 | A | 1/1991 | Sasaki |
| 4,992,646 | A | 2/1991 | Collin |
| 5,023,904 | A | 6/1991 | Kaplan |
| 5,053,607 | A | 10/1991 | Carlson |
| 5,054,096 | A | 10/1991 | Beizer |
| 5,080,748 | A | 1/1992 | Bonomi |
| 5,111,395 | A | 5/1992 | Smith |
| 5,121,945 | A | 6/1992 | Thomson et al. |
| 5,122,950 | A | 6/1992 | Mee |
| 5,136,502 | A | 8/1992 | Van Remortel et al. |
| 5,175,682 | A | 12/1992 | Higashiyama |
| 5,187,750 | A | 2/1993 | Behera |
| 5,198,975 | A | 3/1993 | Baker et al. |
| 5,220,501 | A | 6/1993 | Lawlor |
| 5,225,978 | A | 7/1993 | Peterson |
| 5,237,159 | A | 8/1993 | Stephens |
| 5,265,007 | A | 11/1993 | Barnhard, Jr. et al. |
| 5,283,829 | A | 2/1994 | Anderson |
| 5,287,269 | A | 2/1994 | Dorrough et al. |
| 5,311,594 | A | 5/1994 | Penzias |
| 5,315,508 | A | 5/1994 | Bain et al. |
| 5,321,238 | A | 6/1994 | Watanabe |
| 5,326,959 | A | 7/1994 | Perazza |
| 5,336,870 | A | 8/1994 | Hughes |
| 5,349,170 | A | 9/1994 | Kern |
| 5,350,906 | A | 9/1994 | Brody et al. |
| 5,367,581 | A | 11/1994 | VanHorn |
| 5,373,550 | A | 12/1994 | Campbell |
| 5,396,417 | A | 3/1995 | Burks |
| 5,402,474 | A | 3/1995 | Miller |
| 5,412,190 | A | 5/1995 | Kopesec |
| 5,424,938 | A | 6/1995 | Wagner |
| 5,430,644 | A | 7/1995 | Deaton et al. |
| 5,432,506 | A | 7/1995 | Chapman |
| 5,444,794 | A | 8/1995 | Uhland |
| 5,444,841 | A | 8/1995 | Glasser et al. |
| 5,446,740 | A | 8/1995 | Yien |
| 5,448,471 | A | 9/1995 | Deaton et al. |
| 5,465,206 | A | 11/1995 | Hilt et al. |
| 5,477,040 | A | 12/1995 | Lalonde |
| 5,479,494 | A | 12/1995 | Clitherow |
| 5,483,445 | A | 1/1996 | Pickering |
| 5,484,988 | A | 1/1996 | Hills |
| 5,502,576 | A | 3/1996 | Ramsay et al. |
| 5,504,677 | A | 4/1996 | Pollin |
| 5,506,691 | A | 4/1996 | Bednar et al. |
| 5,508,731 | A | 4/1996 | Kohorn |
| 5,513,250 | A | 4/1996 | McAllister |
| 5,532,464 | A | 7/1996 | Josephson et al. |
| 5,544,043 | A | 8/1996 | Miki et al. |
| 5,544,046 | A | 8/1996 | Niwa |
| 5,550,734 | A | 8/1996 | Tater |
| 5,551,021 | A | 8/1996 | Harada |
| 5,557,515 | A | 9/1996 | Abbruzzese et al. |
| 5,563,400 | A | 10/1996 | Le Roux |
| 5,566,330 | A | 10/1996 | Sheffield |
| 5,568,489 | A | 10/1996 | Yien |
| 5,570,465 | A | 10/1996 | Tsakanikas |
| 5,572,004 | A | 11/1996 | Raimann |
| 5,583,759 | A | 12/1996 | Geer |
| 5,583,760 | A | 12/1996 | Klesse |
| 5,590,196 | A | 12/1996 | Moreau |
| 5,590,197 | A | 12/1996 | Chen |
| 5,592,377 | A | 1/1997 | Lipkin |
| 5,592,378 | A | 1/1997 | Cameron |
| 5,603,025 | A | 2/1997 | Tabb |
| 5,615,109 | A | 3/1997 | Eder |
| 5,621,201 | A | 4/1997 | Langhans |
| 5,640,577 | A | 6/1997 | Scharmer |
| 5,642,419 | A | 6/1997 | Rosen |
| 5,649,117 | A | 7/1997 | Landry |
| 5,652,786 | A | 7/1997 | Rogers |
| 5,659,165 | A | 8/1997 | Jennings |
| 5,659,469 | A | 8/1997 | Deaton et al. |
| 5,659,741 | A | 8/1997 | Eberhardt |
| 5,666,493 | A | 9/1997 | Wojcik et al. |
| 5,677,955 | A | 10/1997 | Doggett et al. |
| 5,679,938 | A | 10/1997 | Templeton |
| 5,679,940 | A | 10/1997 | Templeton |
| 5,687,250 | A | 11/1997 | Curley et al. |
| 5,692,132 | A | 11/1997 | Hogan |
| 5,699,528 | A | 12/1997 | Hogan |
| 5,703,344 | A | 12/1997 | Bezy et al. |
| 5,704,044 | A | 12/1997 | Tarter et al. |
| 5,708,422 | A | 1/1998 | Blonder et al. |
| 5,715,298 | A | 2/1998 | Rogers |
| 5,715,314 | A | 2/1998 | Payne |
| 5,715,399 | A | 2/1998 | Bezos |
| 5,717,989 | A | 2/1998 | Tozzoli et al. |
| 5,724,424 | A | 3/1998 | Gifford |
| 5,727,249 | A | 3/1998 | Pollin |
| 5,748,780 | A | 5/1998 | Stolfo |
| 5,751,842 | A | 5/1998 | Eccles |
| 5,757,917 | A | 5/1998 | Rose et al. |
| 5,770,843 | A | 6/1998 | Rose et al. |
| 5,774,553 | A | 6/1998 | Rosen |
| 5,784,696 | A | 7/1998 | Melnikof |
| 5,793,861 | A | 8/1998 | Haigh |
| 5,794,221 | A | 8/1998 | Egendorf |
| 5,802,498 | A | 9/1998 | Comesanas |
| 5,802,499 | A | 9/1998 | Sampson et al. |
| 5,819,236 | A | 10/1998 | Josephson |
| 5,819,238 | A | 10/1998 | Fernholz |
| 5,826,241 | A | 10/1998 | Stein |
| 5,826,245 | A | 10/1998 | Sandberg-Diment |
| 5,832,447 | A | 11/1998 | Rieker |
| 5,832,460 | A | 11/1998 | Bednar |
| 5,832,464 | A | 11/1998 | Houvener et al. |
| 5,832,488 | A | 11/1998 | Eberhardt |
| 5,835,580 | A | 11/1998 | Fraser |
| 5,835,603 | A | 11/1998 | Coutts |
| 5,835,899 | A | 11/1998 | Rose et al. |
| 5,852,812 | A | 12/1998 | Reeder |
| 5,859,419 | A | 1/1999 | Wynn |
| 5,864,609 | A | 1/1999 | Cross et al. |
| 5,870,456 | A | 2/1999 | Rogers |
| 5,870,721 | A | 2/1999 | Norris |
| 5,870,723 | A | 2/1999 | Pare |
| 5,870,725 | A | 2/1999 | Belinger et al. |
| 5,873,072 | A | 2/1999 | Kight |
| 5,883,810 | A | 3/1999 | Franklin et al. |
| 5,884,288 | A | 3/1999 | Chang |
| 5,897,625 | A | 4/1999 | Gustin |
| 5,898,157 | A | 4/1999 | Mangili et al. |
| 5,903,881 | A | 5/1999 | Schrader |
| 5,910,896 | A | 6/1999 | Hahn-Carlson |
| 5,910,988 | A | 6/1999 | Ballard |
| 5,917,965 | A | 6/1999 | Cahill et al. |
| 5,920,847 | A | 7/1999 | Kolling et al. |
| 5,930,778 | A | 7/1999 | Geer |
| 5,940,811 | A | 8/1999 | Norris |
| 5,940,844 | A | 8/1999 | Cahill et al. |
| 5,943,656 | A | 8/1999 | Crooks |
| 5,945,653 | A | 8/1999 | Walker et al. |
| 5,956,700 | A | 9/1999 | Landry |
| 5,963,659 | A | 10/1999 | Cahill et al. |
| 5,963,925 | A | 10/1999 | Kolling et al. |
| 5,966,698 | A | 10/1999 | Pollin |
| 5,978,780 | A | 11/1999 | Watson |

| | | | | | | |
|---|---|---|---|---|---|---|
| 5,987,435 | A | 11/1999 | Weiss et al. | 6,304,858 | B1 | 10/2001 | Mosler et al. |
| 5,987,436 | A | 11/1999 | Halbrook | 6,321,212 | B1 | 11/2001 | Lange |
| 5,987,439 | A | 11/1999 | Gustin et al. | 6,324,524 | B1 | 11/2001 | Lent et al. |
| 5,991,750 | A | 11/1999 | Watson | 6,338,047 | B1 | 1/2002 | Wallman |
| 6,000,832 | A | 12/1999 | Franklin et al. | 6,338,049 | B1 | 1/2002 | Walker et al. |
| 6,003,762 | A | 12/1999 | Hayashida | 6,374,235 | B1 | 4/2002 | Chen et al. |
| 6,006,208 | A | 12/1999 | Forst et al. | 6,393,409 | B2 | 5/2002 | Young et al. |
| 6,009,442 | A | 12/1999 | Chen et al. | 6,405,173 | B1 | 6/2002 | Honarvar et al. |
| 6,014,636 | A | 1/2000 | Reeder | 6,415,259 | B1 | 7/2002 | Wolfinger et al. |
| 6,016,482 | A | 1/2000 | Molinari et al. | 6,418,419 | B1 | 7/2002 | Nieboer et al. |
| 6,016,484 | A | 1/2000 | Williams et al. | 6,418,420 | B1 | 7/2002 | DiGiorgio et al. |
| 6,026,388 | A | 2/2000 | Liddy et al. | 6,418,430 | B1 | 7/2002 | DeFazio et al. |
| 6,029,139 | A | 2/2000 | Cunningham et al. | 6,446,072 | B1 | 9/2002 | Schulze et al. |
| 6,032,133 | A | 2/2000 | Hilt et al. | 6,490,568 | B1 | 12/2002 | Omara et al. |
| 6,032,137 | A | 2/2000 | Hallard | 6,493,685 | B1 | 12/2002 | Ensel et al. |
| 6,035,281 | A | 3/2000 | Crosskey et al. | 6,535,896 | B2 | 3/2003 | Britton et al. |
| 6,035,285 | A | 3/2000 | Schlect et al. | 6,574,350 | B1 | 6/2003 | Rhoads et al. |
| 6,035,287 | A | 3/2000 | Stallaert et al. | 6,574,377 | B1 | 6/2003 | Cahill et al. |
| 6,038,553 | A | 3/2000 | Hyde, Jr. | 6,578,000 | B1 | 6/2003 | Dodrill et al. |
| 6,041,312 | A | 3/2000 | Bickerton et al. | 6,578,015 | B1 | 6/2003 | Haseltine et al. |
| 6,041,315 | A | 3/2000 | Pollin | 6,609,113 | B1 | 8/2003 | O'Leary et al. |
| 6,044,362 | A | 3/2000 | Neely | 6,609,125 | B1 | 8/2003 | Layne et al. |
| 6,052,674 | A | 4/2000 | Zervides et al. | 6,629,081 | B1 | 9/2003 | Cornelius et al. |
| 6,058,380 | A | 5/2000 | Anderson et al. | 6,636,615 | B1 | 10/2003 | Rhoads et al. |
| 6,058,381 | A | 5/2000 | Nelson | 6,704,714 | B1 | 3/2004 | O'Leary et al. |
| 6,061,665 | A | 5/2000 | Bahreman | 6,721,715 | B2 | 4/2004 | Nemzow |
| 6,064,764 | A | 5/2000 | Bhaskaran et al. | 6,825,940 | B1 | 11/2004 | Wu et al. |
| 6,065,675 | A | 5/2000 | Teicher | 6,954,896 | B1 | 10/2005 | Dodrill et al. |
| 6,067,524 | A | 5/2000 | Byerly et al. | 6,970,259 | B1 | 11/2005 | Lunt et al. |
| 6,070,150 | A | 5/2000 | Remington et al. | 7,062,456 | B1 | 6/2006 | Riehl et al. |
| 6,070,798 | A | 6/2000 | Nethery | 7,104,443 | B1 | 9/2006 | Paul et al. |
| 6,073,104 | A | 6/2000 | Field | 7,177,836 | B1 | 2/2007 | German et al. |
| 6,073,113 | A | 6/2000 | Guinan | 2001/0018739 | A1 | 8/2001 | Anderson et al. |
| 6,076,072 | A | 6/2000 | Libman | 2001/0032139 | A1 | 10/2001 | Debonnet, Jr. |
| 6,078,907 | A | 6/2000 | Lamm | 2001/0037309 | A1 | 11/2001 | Vrain |
| 6,081,790 | A | 6/2000 | Rosen | 2001/0047334 | A1 | 11/2001 | Nappe et al. |
| 6,085,168 | A | 7/2000 | Mori et al. | 2001/0047489 | A1 | 11/2001 | Ito et al. |
| 6,088,683 | A | 7/2000 | Jalili | 2002/0002520 | A1 | 1/2002 | Gatto |
| 6,088,685 | A | 7/2000 | Kiron et al. | 2002/0004774 | A1 | 1/2002 | Defarlo |
| 6,088,686 | A | 7/2000 | Walker et al. | 2002/0012445 | A1 | 1/2002 | Perry |
| 6,092,056 | A | 7/2000 | Tull, Jr. et al. | 2002/0013728 | A1 | 1/2002 | Wilkman |
| 6,098,053 | A | 8/2000 | Slater | 2002/0023055 | A1 | 2/2002 | Antognini et al. |
| 6,098,070 | A | 8/2000 | Maxwell | 2002/0026394 | A1 | 2/2002 | Savage et al. |
| 6,105,011 | A | 8/2000 | Morrison, Jr. | 2002/0038363 | A1 | 3/2002 | MacLean |
| 6,108,639 | A | 8/2000 | Walker et al. | 2002/0052842 | A1 | 5/2002 | Schuba et al. |
| 6,110,044 | A | 8/2000 | Stern | 2002/0055907 | A1 | 5/2002 | Pater et al. |
| 6,111,858 | A | 8/2000 | Greaves et al. | 2002/0069134 | A1 | 6/2002 | Solomon |
| 6,115,690 | A | 9/2000 | Wong | 2002/0072976 | A1 | 6/2002 | Virtanen et al. |
| 6,119,106 | A | 9/2000 | Mersky et al. | 2002/0077978 | A1 | 6/2002 | O'Leary et al. |
| 6,119,107 | A | 9/2000 | Polk | 2002/0087468 | A1 | 7/2002 | Ganesan et al. |
| 6,125,354 | A | 9/2000 | MacFarlane et al. | 2002/0087469 | A1 | 7/2002 | Ganesan et al. |
| 6,128,602 | A | 10/2000 | Northington et al. | 2002/0091635 | A1 | 7/2002 | Dilip et al. |
| 6,128,603 | A | 10/2000 | Dent et al. | 2002/0107770 | A1 | 8/2002 | Meyer et al. |
| 6,129,273 | A | 10/2000 | Shah | 2002/0107788 | A1 | 8/2002 | Cunningham |
| 6,138,118 | A | 10/2000 | Koppstein et al. | 2002/0111837 | A1 | 8/2002 | Aupperle |
| 6,144,946 | A | 11/2000 | Iwamura | 2002/0138398 | A1 | 9/2002 | Kalin et al. |
| 6,148,293 | A | 11/2000 | King | 2002/0170966 | A1 | 11/2002 | Hannigan et al. |
| 6,149,056 | A | 11/2000 | Stinson et al. | 2002/0178071 | A1 | 11/2002 | Walker et al. |
| 6,173,272 | B1 | 1/2001 | Thomas et al. | 2002/0184151 | A1 | 12/2002 | Maloney |
| 6,181,837 | B1 | 1/2001 | Cahill et al. | 2002/0194096 | A1 | 12/2002 | Falcone et al. |
| 6,185,544 | B1 | 2/2001 | Sakamoto et al. | 2002/0198817 | A1 | 12/2002 | Dhir |
| 6,195,647 | B1 | 2/2001 | Martyn et al. | 2002/0199182 | A1 | 12/2002 | Whitehead |
| 6,202,054 | B1 | 3/2001 | Lawlor et al. | 2003/0018557 | A1 | 1/2003 | Gilbert et al. |
| 6,205,433 | B1 | 3/2001 | Boesch et al. | 2003/0023543 | A1* | 1/2003 | Gunewardena et al. ........ 705/38 |
| 6,227,447 | B1 | 5/2001 | Campisano | 2003/0037002 | A1 | 2/2003 | Higgins et al. |
| 6,233,566 | B1 | 5/2001 | Levine et al. | 2003/0046218 | A1 | 3/2003 | Albanese et al. |
| 6,236,972 | B1 | 5/2001 | Shkedy | 2003/0097335 | A1 | 5/2003 | Muskowitz et al. |
| 6,236,980 | B1 | 5/2001 | Reese | 2003/0105641 | A1 | 6/2003 | Lewis |
| 6,240,444 | B1 | 5/2001 | Fin et al. | 2003/0110442 | A1 | 6/2003 | Battle |
| 6,278,981 | B1 | 8/2001 | Dembo et al. | 2003/0120686 | A1 | 6/2003 | Kim et al. |
| 6,289,322 | B1 | 9/2001 | Kitchen et al. | 2003/0187789 | A1 | 10/2003 | Karas et al. |
| 6,292,789 | B1 | 9/2001 | Schutzer | 2003/0191710 | A1 | 10/2003 | Green et al. |
| 6,301,379 | B1 | 10/2001 | Thompson et al. | 2003/0208421 | A1 | 11/2003 | Vicknair et al. |

| | | | |
|---|---|---|---|
| 2003/0208441 | A1 | 11/2003 | Poplawski et al. |
| 2003/0225663 | A1 | 12/2003 | Horan et al. |
| 2003/0233305 | A1 | 12/2003 | Solomon |
| 2003/0237046 | A1 | 12/2003 | Parker et al. |
| 2004/0064409 | A1 | 4/2004 | Kight et al. |
| 2004/0078328 | A1 | 4/2004 | Talbert et al. |
| 2004/0201735 | A1 | 10/2004 | Baron |
| 2004/0228514 | A1 | 11/2004 | Houle et al. |
| 2005/0033690 | A1 | 2/2005 | Antognini et al. |
| 2005/0177480 | A1 | 8/2005 | Huang |

FOREIGN PATENT DOCUMENTS

| | | |
|---|---|---|
| WO | WO 91/16691 | 10/1991 |
| WO | WO 93/08545 | 4/1993 |
| WO | WO 94/28497 | 12/1994 |
| WO | WO 96/08783 | 3/1996 |
| WO | WO 96/12242 A1 | 4/1996 |
| WO | WO 97/14108 | 4/1997 |
| WO | WO 97/45796 | 12/1997 |
| WO | WO 97/45814 | 12/1997 |
| WO | WO 98/09260 | 3/1998 |
| WO | WO 99/10823 | 3/1999 |
| WO | WO 99/56192 | 11/1999 |
| WO | WO 00/39979 | 7/2000 |
| WO | WO 01/31538 A1 | 5/2001 |
| WO | WO 01/37166 A2 | 5/2001 |
| WO | WO 01/75730 A2 | 10/2001 |
| WO | WO 02/063432 A2 | 8/2002 |
| WO | WO 2004/079603 | 9/2004 |

OTHER PUBLICATIONS

Peter Atrill et al, Management Accounting, 1994, Blackwell Publishers, pp. 12-13.*

Roger Schroeder, Operations Management, 1993, McGraw-Hill, Inc., pp. 89-94 and 125.*

Terrie Miller and Henry Yan. "When Custody Governs." Benefits Canada. Toronto: Feb. 1998. vol. 22, Iss. 2; p. 33, 5 pgs.*

Annual Report Pursuant to Sectin 13 or 15(d) of The Securities Exchange Act of 1934, Form 10-K, Intelidata Technologies Corporation, Fiscal Year Ended Dec. 31, 2001.

Blockbuster running test of a stored value card, The American Banker, Sep. 1, 1995.

CES/NaBANCO introduces stored value card technology blockbluster video is first merchant partner, Business Wire, Inc., Jan. 15, 1996.

Card Flash Daily Payment Card News, www.cardweb.com, printed Sep. 23, 2004.

Anonymous, Chase Manhattan introduces new FEDI payables product, ProQuest document ID: 7806951, ISSN/ISBN: 02686635, May 1995.

Bills, Chase Pact Done, What's Next for Web Vendors?, The American Banker, Technology Section, Jun. 3, 2002, p. 23.

Reinbach, Chase steps up treasury system, ProQuest documednt ID 8723558, ISSN/ISBN: 10459472, Nov. 1995.

Anonymous, Chasing the global trend, Cash Management News, proQuest document ID 9319923, ISSN/ISBN: 02686635, Dec. 1995..

Malhotra, Clearing House Enumerates e-Payments Ills, The American Banker, vol. 167, No. 154, Aug. 23, 2002.

Marjanovic, Corporate Services: Chase Gears Up Global Payments Systems Series: 16, The American Banker, vol. 160, Issue 174, Sep. 11, 1995, p. 41.

Gluck, Creating a Global Cash-Management Game Plan, Bank Systems & Technology, Feb. 1997, p. 28.

Lamond, Credit Card Transactions Real World and Online, Paying By Credit Card-Real World and Online, http://www.virtualschool.edu/mon/ElectronicProperty/klamond/credit, printed Jul. 8, 2005, 17 pages.

Lamond, Keith, Credit Card Transactions Real World and Online, http://www.virtualschool.edu/mon/ElectronicProperty/klamond/credit_card.htm, pp. 1-17, printed Jul. 8, 2005.

Dialog file 20, #10279554; Offer: Book Yourself Free Cassettes; Mar. 25, 2000; Birmingham Post, p. 16.

Du Pont's Electronic Payments, Corporate EFT Report, v9, n1, Dialog file 636, Accession No. 01066902, Jan. 11, 1989.

Carreker, Electronic check presentment: Capturing new technology, http://proquest.umi.com, Banking Management, Rolling Meadows: vol. 71, Issue 2, Mar./Apr. 1995, p. 32, 5 pages.

Fidelity Helps Fund Sellers Trim the Taxes They'll Owe, The Wall Street Journal, Nov. 7, 2002.

First Data markets stored-value cards, Cards International, Jan. 30, 1996, p. 5.

Norris, First data unit develops blockbuster cash card, Omaha World Hearld Sunrise Edition, Business Section, Jan. 19, 1996, p. 16.

Harsh Truth: Your Investments Likely Won't Make Any Money, no date.

Money, Initial Launch to 200 Credit Unions, USA Today.com, Jun. 27, 2002.

Decovny, Net Scope, Banking Technology, May 1997.

Nokia Announces the World's First NFC Enabled Mobile Product for Contactless Payment and Ticketing, PRNewswire, Feb. 9, 2005.

Goode, On Profit, Loss and the Mysteries of the Mind, The New York Times, Nov. 5, 2002.

Anonymous, Operating in a multi-currency environment, ProQuest document ID 9215937, ISSN/ISBN 09589309, Oct. 1995.

Maher and Troutman, Payor's Prescription for Painless Migration to Electronic Healthcare Payments and Remittance Advices, PNC Bank, Dec. 2001.

Press Release, Mar. 5, 2004, Payment Data Systems Files Patent on Debit Card Payment Solution, American City Business Journals, Inc., Mar. 5, 2004.

Maher and Troutman, Provider's Prescription for Painless Migration to Receipt of Electronic Healthcare Payments and Remittance Advices, PNC Bank, Dec. 2001.

Anonymous, Systems spell change for foreign exchange, Global Investor, ProQuest document ID 1056152B, ISSN/ISBN: 09513604, Nov. 1996.

French, Tech Stocks: Market Movers, Investors Worry CheckFree Being Chased from Its Own Game, http://www.thestreet.com, Jun. 20, 2002.

Technology, In Brief Wachovia-InteliData Deal, May 7, 2002.

Zuckerman, The Hedge-Fund Craze, The Wall Street Journal, Jun. 12, 2002.

McDonald, The Stars in the Sky Flicker, And Fund Stars Do the Same, The Wall Street Journal, Jan. 15, 2003.

Anonymous, Visa & Carnegie Mellon Plan Online Payment Scheme, Newsbyte News Network, Feb. 15, 1995.

Financial News, Wells Fargo Rolls Out Nationwide Lockbox Check Conversion, PR Newswire Association, Apr. 22, 2003.

* cited by examiner

| Reference | Acct Num | Type | Actual Days Late | Business Days Late | Fail Description | Security Description | Trade Units | Trade Amt (USD) | Clearer |
|---|---|---|---|---|---|---|---|---|---|
| 62995567 Detail | 04433 | SELL | 1 | 1 | SETTLED - CONFIRMATION DISCREPANCY History | Security 1 | 83,000 | 180,555 | Clearer 1 |
| 62827343 Detail | 04433 | SELL | 1 | 1 | COUNTERPARTY HAS NO INSTRUCTIONS History | Security 2 | 6,000 | 48,352 | Clearer 2 |

Fail Trade Summary for Broker 1 ( 111111 ) in Japan
Period : 01-Aug-01 – 31-Aug-01

Figure 11

| Fail Reason History Trade Reference : 62827342 |||
|---|---|---|
| Trade Date | Contractual Settle Date | Actual Settle Date |
| 08/06/2001 | 08/09/2001 | 08/10/2001 |
| Date of Fail Reason Update | | Reason |
| 08/07/2001 | | UNSPECIFIED |
| 08/10/2001 | | COUNTERPARTY HAS NO INSTRUCTIONS |

Figure 13

| Fail Reason | Failed Trades | Percent Total Failed Trade Count | Failed Trade Volume | Percent Total Failed Trade Volume |
|---|---|---|---|---|
| COUNTERPARTY HAS NO INSTRUCTIONS | 3 | 15.79% | 462,205 | 8.35% |
| COUNTERPARTY SHORT OF SHARES | 14 | 73.68% | 4,351,738 | 78.64% |
| SETTLED - CONFIRMATION DISCREPANCY | 2 | 10.53% | 720,043 | 13.01% |
| Totals | 19 | 100.00% | 5,533,986 | 100.00% |

| | Home Page | Broker Rankings | Broker Analytics | Preferences | Site Map | Contact Us | Help |

Search By: › Ultimate Parent › Parent › Principal Broker

Principal Broker 1 ( 111111 ) Pair Ranking
Clearer Clearer 1 LIMITED ( 121212 ) ★

Clearing Brokers | Clearer 1 | Search

Entity Level: Principal/Clearer Pair
Peer: Peer Group One [Top 10% (36 Total Members)] View Members

| Total Individual Statistics(Unfiltered)<br>For Period : 01-Aug-01 - 31-Aug-01 | | | | Aggregate Figures for All Brokers<br>(Filtered) | |
|---|---|---|---|---|---|
| | All Trades | Failed Trades | Fail Rate | ?Total Trades Count | 44,835 |
| Trade Count | 4,340 | 232 | 5.35% | ?Total Fail Count | 1,726 |
| Volume (USD) | 3,935,770,163 | 306,114,728 | 7.78% | ?Total Settle (USD) | 10,961,083,732 |
| | | | | ?Total Failed (USD) | 533,452,078 |

| Region | Country | Security Type | Transaction Type | Payment Indicator | Period |
|---|---|---|---|---|---|
| ALL | JP-Japan | ALL | ALL | ALL | 08/01/2001 - 08/31/2001 |

| STATISTICS (Filtered) | Principal/Clearer | Principal Only | Ratio |
|---|---|---|---|
| Total Individual Trade Count | 538 | 667 | 80.66 |
| Total Individual Fail Count  Fail Reason Summary | 18 | 19 | 94.74 |
| Total Individual Trade Amount (USD) | 194,341,688 | 246,465,048 | 78.85 |
| Total Individual Fail Amount (USD) | 4,724,425 | 5,533,986 | 85.37 |

| METRICS (Filtered) | Principal/Clearer Combo's Metrics | Principal Broker's Metrics | Principal/Clearer Ranking | Principal Only Ranking |
|---|---|---|---|---|
| ?Individual Trades to Aggregate Trade Count | 1.200 % | 1.488 % | ★ | ★ |
| ? Individual Fails to Aggregate Trade Count | 0.040 % | 0.042 % | ★ | ★ |
| ? Individual Fail Count to Aggregate Fail Count | 1.043 % | 1.101 % | ★ | ★ |
| ? Individual Settle Amt. to Aggregate Settle Amt. | 1.773 % | 2.249 % | ★ | ★ |
| ? Individual Fails Settle Amt. to Aggregate Settle Amt. | 0.043 % | 0.050 % | ★ | ★ |
| ? Individual Fails Settle to Aggregate Fails Settle | 0.886 % | 1.037 % | ★ | ★ |
| ?Individual Fail Rate | 3.346 % | 2.849 % | ★ | ★ |
| ? Individual Settle Fail Rate | 2.431 % | 2.245 % | ★ | ★ |
| ?Average Fail Duration (Bus Days) | 1.00 days | 1.05 days | ★ | ★ |
| ?Average Fail Duration (Act Days) | 1.56 days | 1.58 days | ★ | ★ |

Figure 21

SYSTEM AND METHOD FOR TRADE SETTLEMENT TRACKING AND RELATIVE RANKING

CROSS REFERENCE TO RELATED APPLICATIONS

This Application claims priority to Provisional Application number 60/295,397 filed on Jun. 1, 2001, the entirety of which is incorporated by reference.

FIELD OF THE INVENTION

This invention relates generally to the evaluation and analysis of the post-trade settlement process, and more particularly to a system and method for measuring post-trade settlement performance in terms of failed trades.

BACKGROUND OF THE INVENTION

Financial trading transactions typically involve two or more parties exchanging a financial instrument, such as a security, in exchange for value. After the parties agree to enter into the transaction, they make arrangements to settle the transaction, i.e., to actually effectuate the transfer of the securities to the buyer. The post-trade settlement process may also include independent third parties such as escrow agents and custodians, who hold the property or payment of one party in anticipation of the future transfer of securities. However, there is always a risk to the parties that the transaction may never actually settle.

In the global securities market, the risk of settlement failure is increased by the complexity of the transactions. For example, an orderer, who is either a buyer or a seller, will issue a trade instruction to his broker/dealer who executes the trade and sends a notice of execution back to the orderer. The orderer then transmits the trade details and allocations to his broker/dealer who either accepts or rejects the trade details and allocations and transmits an acceptance or rejection back to the orderer. If the trade details and allocations are accepted, the broker/dealer provides additional information related to the trade and transmits a trade confirmation to the orderer. The orderer must then validate the information included in the trade confirmation and respond with an affirmation—representing the formation of a legally binding contract for the transaction. Both the orderer and the broker/dealer then transmit the trade to their respective settling agents who must arrange for the instructed exchange of funds and securities on the settlement date.

The number of parties and exchanges involved complicates the post-trade process, lengthening settlement times and consequently increasing the risk to parties of settlement failure. To minimize this risk, markets worldwide have attempted to standardize a deadline for completion of the settlement procedures to within a set number of days of the trade date. In the United States, the Securities and Exchange Commission, which regulates transactions involving the transfer of securities and the exchanges that operate the markets where securities are traded, has mandated that U.S. securities must be settled within three days of the trade date. Transactions that are not settled within this time frame result in settlement failure and represent a significant risk to both brokers and traders.

There are known systems in the art that enable parties to evaluate the performance of their brokers in the post-trade settlement process. For example, WO 01/75730 A2 to Skuriat describes a system in which the performance of brokers in the post-trade settlement process is evaluated based on how much time it takes the broker to complete each step in the post-trade process. The longer the amount of time taken by the broker, the lower his ranking in the Skuriat system.

There is, however, no system currently available that tracks the settlement fail rate of brokers or that evaluates brokers in terms of their ability to settle trades within the time frame required by the market.

SUMMARY OF THE INVENTION

In accordance with an embodiment of the present invention, a distributed computer system is provided that enables end users to evaluate a broker's trade settlement performance by market and across multiple markets in terms of how many of the broker's trades failed. Trades are defined as having failed when the actual settle date exceeds the date on which the trade should have settled. In accordance with an embodiment of the present invention, the system analyzes trade settlement statistics about each broker within the context of a selected broker peer group, and ranks and compares a broker's settlement performance relative to the peer group. The system also ranks the brokers based on a set of metrics relative to the selected peer group. A broker's peer group is defined in terms of the broker's relative size within the trade universe as determined by trade count.

BRIEF DESCRIPTION OF THE DRAWINGS

For the purposes of illustrating the present invention, there is shown in the drawings a form which is presently preferred, it being understood however, that the invention is not limited to the precise form shown by the drawing in which:

FIG. 7 depicts an Ultimate Parent Summary screen in accordance with an exemplary embodiment of the present invention.;

FIG. 8 depicts a view of a User's broker summary screen containing a list of brokers in accordance with an exemplary embodiment of the present invention.;

FIG. 10 depicts a view of a User-Specific Broker Analytics screen in accordance with an exemplary embodiment of the present invention;

FIG. 11 depicts a view of Fail Trade Summary screen in accordance with an exemplary embodiment of the present invention;

FIG. 13 depicts a Fail Reason History screen in accordance with an exemplary embodiment of the present invention;

FIG. 20 depicts a Fail Reason Summary screen in accordance with an exemplary embodiment of the present invention;

FIG. 21 depicts a Principal/Clearer Broker Analytics screen in accordance with an exemplary embodiment of the present invention.

DETAILED DESCRIPTION OF THE INVENTION

Figure 1:
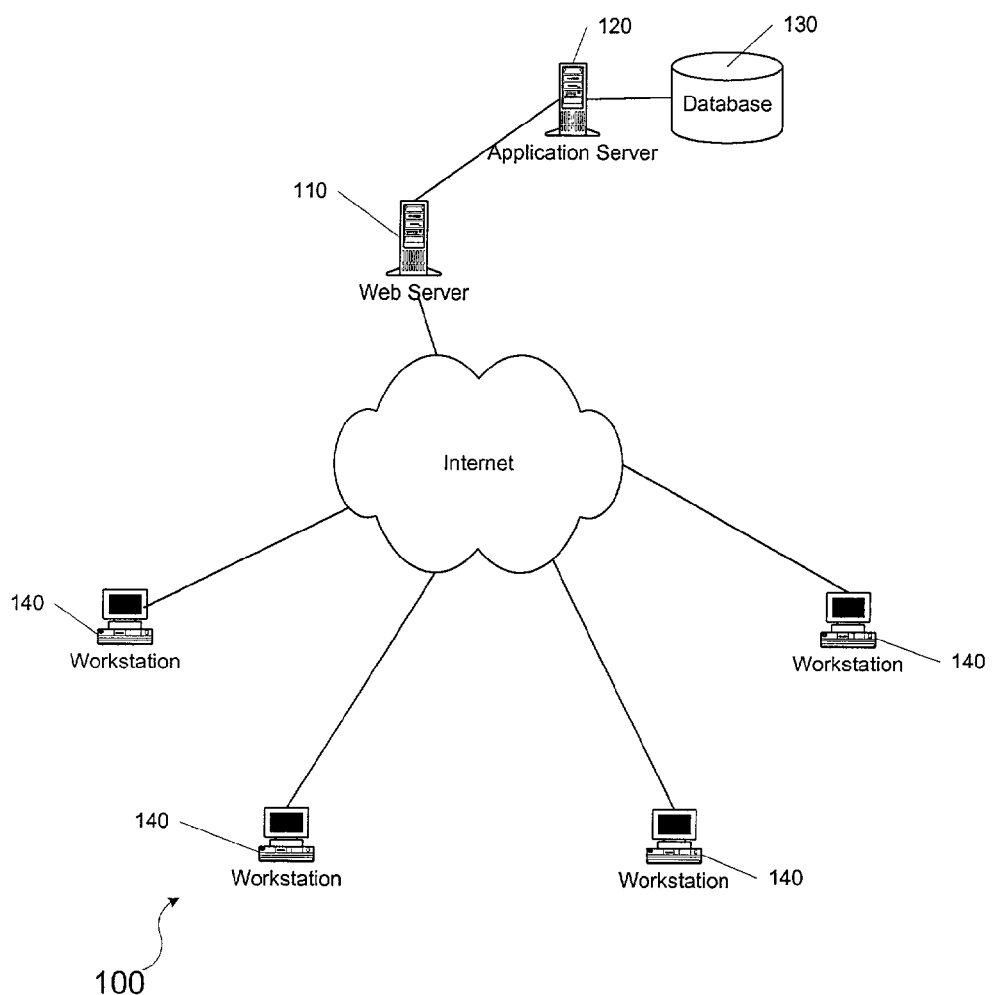
FIG. 1 is block diagram depicting the components of a distributed system in accordance with an embodiment of the present invention.

FIG. 1 is block diagram depicting the components of a distributed computer system 100 in accordance with an exemplary embodiment of the present invention. A Web server 110, an application server 120, and a database 130 may reside on a separate computers connected by way of a conventional data communications network. Alternatively, Web server 110, application server 120, and database 130 may exist as separate processes running on the same host computer.

The application server 120 hosts the server-side software components of a distributed network application that tracks trade settlement failure and ranks brokers in terms of failed trades (the "Application"). The database 130 is preferably a relational database such as Microsoft SQL Server®. The Application running on the application server 120 is programmed to query the database 130, retrieve data, and generate trade settlement failure and broker ranking data. The application server 120 is programmed to dynamically generate pages to the Web server 110. The Web server 110 transmits these pages to the workstations 140. The pages are preferably formatted using Hypertext Markup Language (HTML), Extensible Markup Language (XML), or any other variant capable of being displayed by a conventional Web browser running on the workstations 140. The Web server 110 and the workstations 140 are preferably connected to each other via a TCP/IP based network such as the Internet. Although described in terms of an Internet based configuration, it will be appreciated by those skilled in the art that the system 100 of the present invention may operate entirely on a Local Area Network (LAN), a Wide Area Network (WAN), or through dial-up connections from the workstations 140 to, for example, the application server 120.

Although in this exemplary embodiment the workstations 140 are preferably personal computers running Web browsers, in alternative embodiments a workstation 140 may be any device that can be connected to the Internet, including Personal Digital Assistants (PDAs), cellular telephones, interactive televisions, and other mobile communication devices.

The general methodology by which the Application ranks brokers in terms of failed trades will now be explained. The Application ranks brokers by calculating a relative measure of each individual broker's operational performance, specifically in relation to a broker's ability to settle trades in a timely fashion. The ranking is preferably assessed on a "five-star" scale, the brokers with the best trade settlement performance receiving five stars. The Application awards these stars based on a computed score each broker receives as a result of the methodology algorithm.

In order to understand the Application's methodology, some terms must first be defined. The "trade date" is the date on which a trade was executed in the market place. The "settle date" is the deadline for settlement, and is set in accordance with standard market practice (e.g., in the United States, the SEC requires that all trades settle within three days of the trade date). The "actual settle date" is the date on which the trade actually settles. A "failed trade" is a trade in which the actual settle date extends beyond the settle date.

The underlying statistics used by the Application are preferably based on standard daily market trade transaction data aggregated by month. Although the trade transaction data for a particular month will include all the trades executed in that month, the Application only considers data relating to those trades that have actually settled.

The trade statistics generated by the Application represent the aggregated trade count and total monetary amount for each broker's respective transactions for a given monthly period. That is to say, the trade statistics generated by the Application are aggregate representations of the received daily market transaction data.

The metrics used by the Application to rank the brokers are calculated from each broker's trade statistics, benchmarked against the aggregate total for a user-selected representative population. The user of the Application is able to define the representative broker population by defining peer groups and by filtering the trade statistics by certain pre-defined categories. At all levels, the broker's ranking, trade statistics, trade metrics, and the aggregate population are dynamic depending on the peer group and filtering criteria selected by the user.

Before selecting any filtering criteria, the user must first specify the default parameters for a broker peer group. Peer group specifications are preferably a mandatory and a primary filtering criteria.

The peer group determines the particular subset of brokers, from the applicable universe of brokers, against which any given broker will be ranked across all levels of analysis. A peer group is defined by the relative size of the brokers as measured by transaction count. The end user can define the parameters for the peer groups by segmenting the peer groups by percentile e.g. Peer Group 1 equals the top n % of brokers as determined by size, Peer Group 2 equals the next m %, etc.

After peer group parameters have been set, the user then has the ability to filter the representative data set for several filtering criteria. The first major filtering criteria is the period over which the end user wishes to view the data. The Application also includes additional filtering functionality to enable the user to focus on the particular factors which may be the cause of any given broker's poor relative ranking. The Application preferably includes six criteria by which the user may filer their results:

1. Time Period—defines the time dimension for the data universe;

2. Transaction Type—user can select to view buys or sales;

3. Payment Indicator—allows the user to distinguish between "Pay" (Delivery vs. Payment or Receipt vs. Payment) transactions and "Free" transactions, where there is either no cash associated with the trade or cash settlement is done by a separate transaction;

4. Security Type—user can choose to view transactions for a particular security type, specifically categorized by Debt, Equity, or Other security types. Other security types include derivatives (futures and options); insurance contracts and annuities; mutual funds; unit investment trusts ("UITs"); and repurchase agreements ("repos").

5. Country—at the Ultimate Parent, Parent, and principal broker level, the user can choose to look at the transaction activity in a specified market or across multiple markets. When focused on a specific principal/clearer combination, only one given market applies as a clearing broker implies a local market by default; and 6. Region—at the Ultimate Parent and Parent level, the user can choose to view transaction activity in a specific geographical region.

The trade statistics and metrics are sensitive to the peer group definitions and to whatever filtering the end user has chosen to apply. That is to say, the brokers are ranked relative to the group defined by the user-selected peer group and filtering criteria.

The analysis of brokers' trade settlement performance is done at four distinct levels within the Application: Ultimate Parent (i.e., the holding company or parent corporation); Parent (i.e., the distinct broker/dealer entity); Principal Broker (i.e., the entity corresponding to an individual Broker Identification Code (BIC) which may be a SWIFT Bank Indentifier Code, Depository Trust Company Participant Code, FINS code, etc.); and Principal/Clearer combination. The four levels are hierarchical: each principal broker is mapped to its respective parent entity, and each parent is matched to its ultimate parent. Analysis at the Parent and Ultimate Parent levels is performed on the aggregated trade statistics for all of the individual Principal Brokers comprised by the Parent or Ultimate Parent entity.

For each Principal Broker, Principal/Clearer combination, Parent, or Ultimate Parent known to the Application, a series of trade statistics and calculated metrics are displayed, regardless of the level chosen. The trade metrics are based on and calculated from a set of trade statistics, that preferably includes: total trade count; failed trade count; settlement amount for all of the trades (including those that failed); and settlement amount (for the failed trades only).

From these primary trade statistics, a core set of metrics is derived. The metrics are applied across the four levels of broker analysis in the Application, regardless of the filtering criteria that the end user has chosen to apply. The metrics that are preferably incorporated into the Application's methodology include:

1. Individual Trades to Aggregate Trade Count—an individual broker's trade count as a percentage of the total trade count for all the brokers;

2. Individual Failed Trade Count to Aggregate Trade Count—the individual broker's failed trade count as a percentage of the total trade count for all brokers;

3. Individual Fail Count to Aggregate Fail Count—the individual broker's failed trade count as a percentage of the total count of all failed trades for all brokers;

4. Individual Fail Rate—the quantity of an individual broker's failed trades as a percentage of their own total individual trade count;

5. Individual Settle Amount to Aggregate Settle Amount—the individual broker's trade settlement amount as a percentage of the total settlement amount of all trades for all brokers;

6. Individual Fail Settle Amount to Aggregate Settle Amount—the individual broker's failed trade settlement amount as a percentage of the total settlement amount for all brokers' trades;

7. Individual fail settle amount to Aggregate Fail Settle Amount—the individual broker's failed trade settlement amount as a percentage of the total settlement amount for all brokers' failed trades;

8. Individual Settle Amount Fail Rate—the individual broker's failed trade settlement amount as a percentage of their own individual total settlement amount; and 9. Average Fail Duration—the average number of days past value date (the date the trade was supposed to settle), for all failed trades for each broker, calculated for both business and calendar days.

Each broker is ranked based on its score for each individual metric. In addition, each broker is also assigned a composite ranking which is indicative of its overall operational settlement performance. This composite ranking is preferably calculated by taking the simple average of the individual rankings for the following four metrics: Individual Trades to Aggregate Trade Count; Individual Fail Count to Aggregate Fail Count; Individual Fail Rate; and Average Fail Duration.

At the Ultimate Parent and Parent levels, the Application ranks brokers across all markets for which there is trade activity in the Application's database. Thus, the Application is able to generate a "worldwide" ranking for trade settlement performance of all brokers relative to a peer group. At the Principal Broker level, the user is able to evaluate a broker's performance in any individual market or any combination of markets. At the Principal/Clearer Combination level, the user is able to evaluate a broker's performance solely within a specific market, since the clearing broker function is performed in the local market.

When the Application performs composite rankings of Principal Brokers, Parents, or Ultimate Parents across more than one market, an additional performance metric is calculated called the Market Complexity Factor. Thus, the composite ranking across multiple markets is the based on the simple average of the individual broker rankings for five metrics: Individual Trades to Aggregate Trade Count; Individual Fail Count to Aggregate Fail Count; Individual Fail Rate; Average Fail Duration; and the Market Complexity Factor.

The Market Complexity Factor is a metric that is used to rank brokers based on the complexity of the markets in which the brokers are executing and settling trades. The Market Complexity Factor may be, for example, an efficiency ratio calculated by security type for each market that is considered in the Application's trade data universe.

Each market is assessed on a series of characteristics related to the efficiency of trade settlement within the specific market based on security type. The following eight categories are preferably considered in the efficiency ratio (although, as will be appreciated by one of skill in the art, any set of efficiency characteristics may be employed) and a brief description of the attributes of the market they assess:

| | |
|---|---|
| a. Trade Matching | The extent to which a settlement system matching is mandated in the market. |
| b. Settlement Type | For example, gross settlement vs. real-time gross settlement vs. net settlement. |
| c. Securities Type | For example, dematerialized, |

-continued

| | |
|---|---|
| d. Depository | immobilized, or physical. Whether a central depository or a central registry exists in the market. |
| e. Failure Provisions | For example, fines and penalties to deter failure; buy-ins to remedy failure; and/or securities lending or active repo markets to prevent failure. |
| f. Trade Date/Settlement Date Lapse | The shorter the lag between trade and settlement date, the lesser the mark-to-market exposure. |
| g. Regulatory Oversight | The strength of the regulatory regime. |
| h. Securities Legal Framework | How robust the securities legal framework or arbitration process is in the market |

The efficiency measures are assessed from best practice to worst practice and the results are given a numeric score. For the purpose of applying the Market Complexity Factor within the Application, a broker's trade count within each market is multiplied by the computed efficiency ratio score. The resulting figures for each security type within each market are then added together, and the total sum is divided by the broker's total trade count to come up with a weighted-average figure based on the complexity of the markets in which the broker operates. This weighted-average market complexity figure is then ranked against all members within the broker's peer group.

Each broker is assigned a ranking for each of the above-described metrics, which is a relative measure of the Broker's standing for each metric. The ranking is assessed on a scale of one-half to five "stars" depending on which percentile the broker resides within for each respective metric. The break points for the percentiles are preferably as follows, where X is any given Ultimate Parent, Parent, Principal Broker, or Principal/Clearing Broker pair:

| Broker's Percentile | Star Score (maximum 5 stars) |
|---|---|
| 97.5% < X <= 100% | five stars |
| 92.5% < X <= 97.5% | four & a half stars |
| 85% < X <= 92.5% | four stars |
| 70% < X <= 85% | three & a half stars |
| 50% < X <= 70% | three stars |
| 30% < X <= 50% | two & a half stars |
| 15% < X <= 30% | two stars |
| 7.5% < X = 15% | one & a half stars |
| 2.5% < X = 7.5% | one star |
| X <= 2.5% | half star |

The operation of the Application will now be described. In accordance with an exemplary embodiment of the present invention, a user of the Application, who may be an individual at any trading entity, such as a custody account holder, an asset manager, or a broker/dealer, has a choice between three different views of the statistics generated by the Application. The first view is of statistics relating to trades executed and settled by brokers for an asset manager's individual portfolios, preferably held in custody accounts, i.e., a My Accounts view. The second view is of overall broker rankings within the data universe, i.e., a Broker Rankings view. The third view is of the trade data and metrics for each individual broker within the universe, i.e., a Broker Analytics view.

Figure 2:
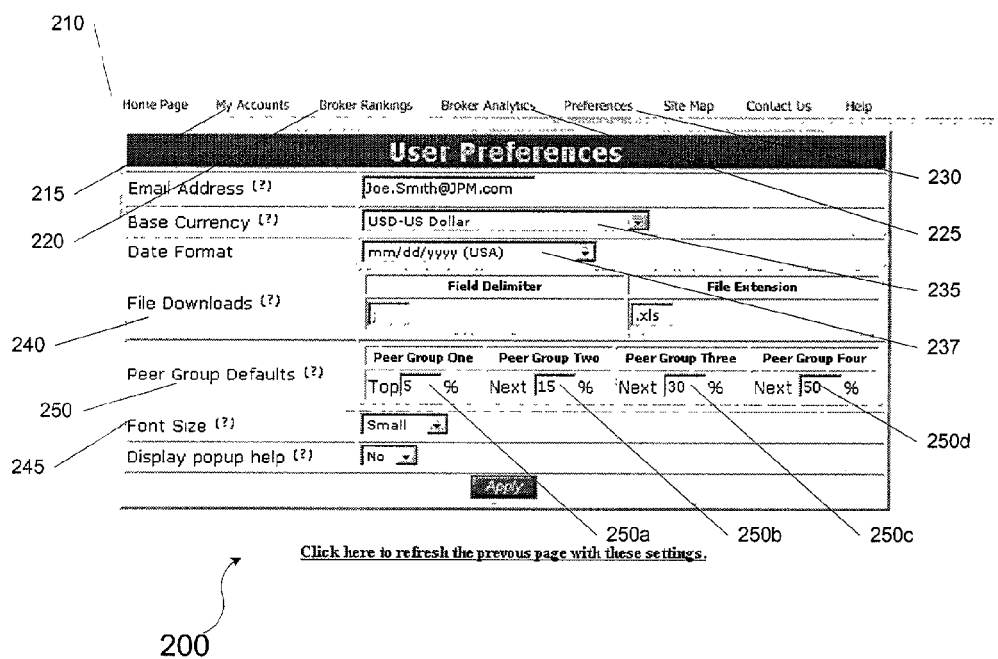
FIG. 2 depicts a view of the Preferences screen in accordance with an exemplary embodiment of the present invention.

FIG. 2 depicts a view of a User Preferences screen in accordance with an exemplary embodiment of the present invention. Along the top of User Preferences screen 200 is a horizontal menu bar 210, which is preferably present on every screen of the Application. Horizontal menu bar 210 enables users to navigate between the My Accounts view, the Broker Rankings view, and the Broker Analytics view.

The My Accounts view, accessible from hyperlink 215, displays trade settlement performance statistics, organized by market, for those trading entities that have executed trades on behalf of the user. The Broker Rankings view, which is accessible from hyperlink 220, displays trade settlement performance statistics for the entire universe of brokers known to the Application. The statistics may be organized by market, as well as by Ultimate Parent broker, Parent broker, individual Principal Broker, and Principal/Clearer Pair.

The trade data and calculated metrics underlying the trade settlement performance statistics for each broker are available from within the Broker Analytics view, accessible from hyperlink 225. The user may arrive at the Broker Analytics content by drilling down through the My Accounts and Broker Rankings views. Alternatively, the user may directly access a specific broker's Broker Analytics screen by searching the Application's databases for a particular broker at any level within the Ultimate Parent/Parent/Principal Broker hierarchy.

The Preferences view 200 is accessible via the preferences hyperlink 230. The Preferences view 200 allows the user to personalize certain Application settings and associate those settings with the user's unique login name. The currency denomination drop down box 235 allows the user to set the currency denomination in which the trade settlement statistics will be displayed. Within the Preferences component the user may also be given the option of customizing certain Application display settings, such as the font size 245. The user may also change the settings that control how data is exported from the Application using the file downloads text boxes 240.

Within the Preferences component, the user may also define and manage his peer group settings. How these peer group settings are defined directly affects the relative ranking of trading entities within the Application. The peer group settings portion 250 of the screen 200 includes, for example, four text boxes 250a, 250b, 250c, and 250d, in which the user may specify percentile boundaries for each of four respective peer groups. For example, if a user were to insert the number "25" in textbox 250a, "25" in textbox 250b, "25" in textbox 250c, and "25" in textbox 250d, he will have defined four quartiles, with Peer Group One comprising the top 25 percent, Peer Group Two comprising the next 25 percent, etc.

The peer groups themselves, as was previously explained, comprise a set of brokers of similar "size," where size may be determined by trade count. For example, if Peer Group One were limited to the top 5% of brokers, it would comprise the top 5% in terms of trade count within a data universe previously defined by the filtering criteria selected by the user. Filtering criteria will be described in greater detail below.

Although there are four textboxes 250a-d set forth in this exemplary embodiment, a user need not create four peer groups, but may create anywhere between one and four peer groups as he sees fit. For example, a user may create a single peer group by placing the number "100" in textbox 250a (which corresponds to Peer Group One), and zeros in the rest of the textboxes 250b-d. Likewise, a user could create two peer groups by placing the number "50" in the first textbox 250a, "50" in the second textbox 250b, and zeros in the third and fourth textboxes 250c-d. The numbers inserted in textboxes 250a, 250b, 250c and 250d preferably add up to one hundred.

A user may select the My Accounts hyperlink 215 to access the My Accounts view. The My Accounts view is preferably accessible to only users who are asset managers and hold a custody account(s) and whose login identifications are successfully authenticated by the Application.

Figure 3:
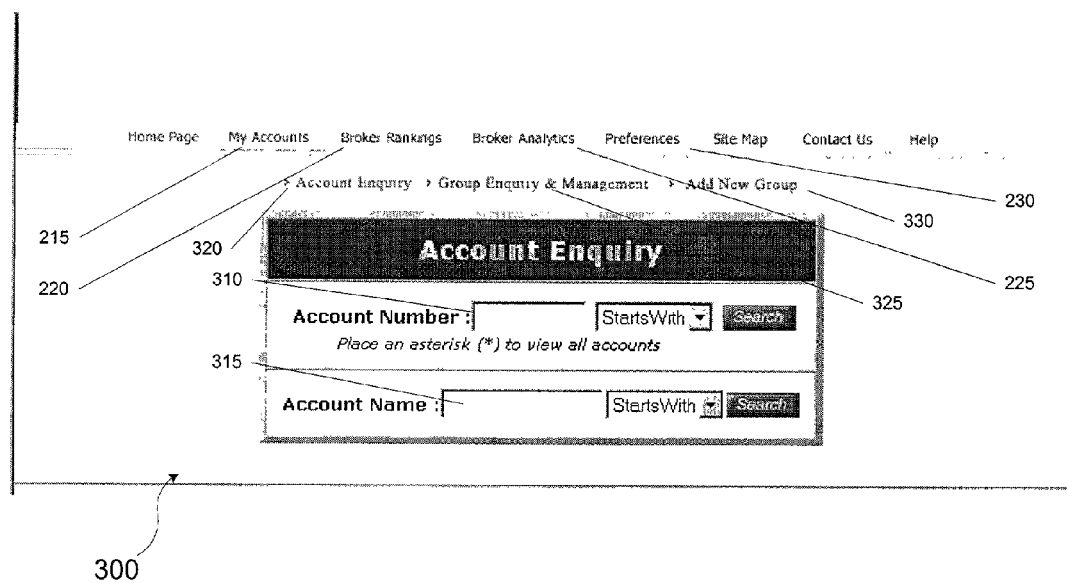
FIG. 3 depicts a view of the Account Enquiry screen in accordance with an exemplary embodiment of the present invention.

Once authenticated, the user is presented with the Account Enquiry screen 300, which is depicted in FIG. 3 in accordance with an exemplary embodiment of the present invention. The Account Enquiry screen may also be accessed by selecting the Account Enquiry hyperlink 320. At the Account Enquiry screen 300, a user may search for one or more custody accounts to which he is authorized access, and about which he would like to view trade settlement statistics and ranking data.

The user has the option of searching through his accounts using account number textbox 310 or account name textbox 315. An asterisk symbol ("*") may be inserted in either textbox 310 or textbox 315 as a wildcard character that will cause the Application to return a list of all the accounts which the user is authorized to access. Upon returning the search results, the Application will prompt the user to select one or more of the accounts listed in order to view broker settlement statistics by country.

Figure 4:
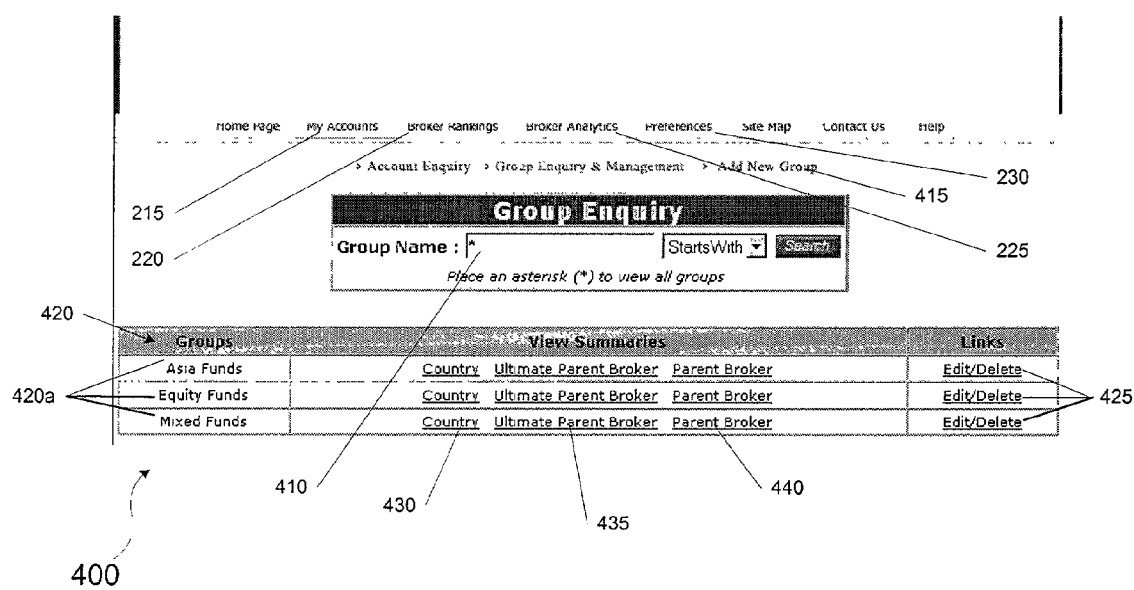
FIG. 4 depicts a view of the Group Enquiry screen in accordance with an exemplary embodiment of the present invention.

FIG. 4 depicts a Group Enquiry screen in accordance with an exemplary embodiment of the present invention. In addition to viewing settlement statistics and ranking data about a trading entity's performance on individual accounts, a user may view performance data for a defined group of custody accounts. To do so, a user may employ the Group Enquiry screen 400, accessible by selecting the Group Enquiry and Management hyperlink 325. At the Group Enquiry screen 400, groups of custody accounts may be defined by selecting the Add New Group hyperlink 415. The user may search for one or more previously defined groups using textbox 410, or may enter the wildcard character "*" to list all the groups available to the user.

The results 420a of the Group Enquiry search are displayed in result display area 420. The user may select the edit/delete hyperlink 425 to either edit or delete a group. The user may also select the country hyperlink 430, Ultimate Parent Broker hyperlink 435, or Parent Broker hyperlink 440 to view trading activity statistics for the selected group, organized respectively by country, Ultimate Parent, or Parent.

Figure 5:
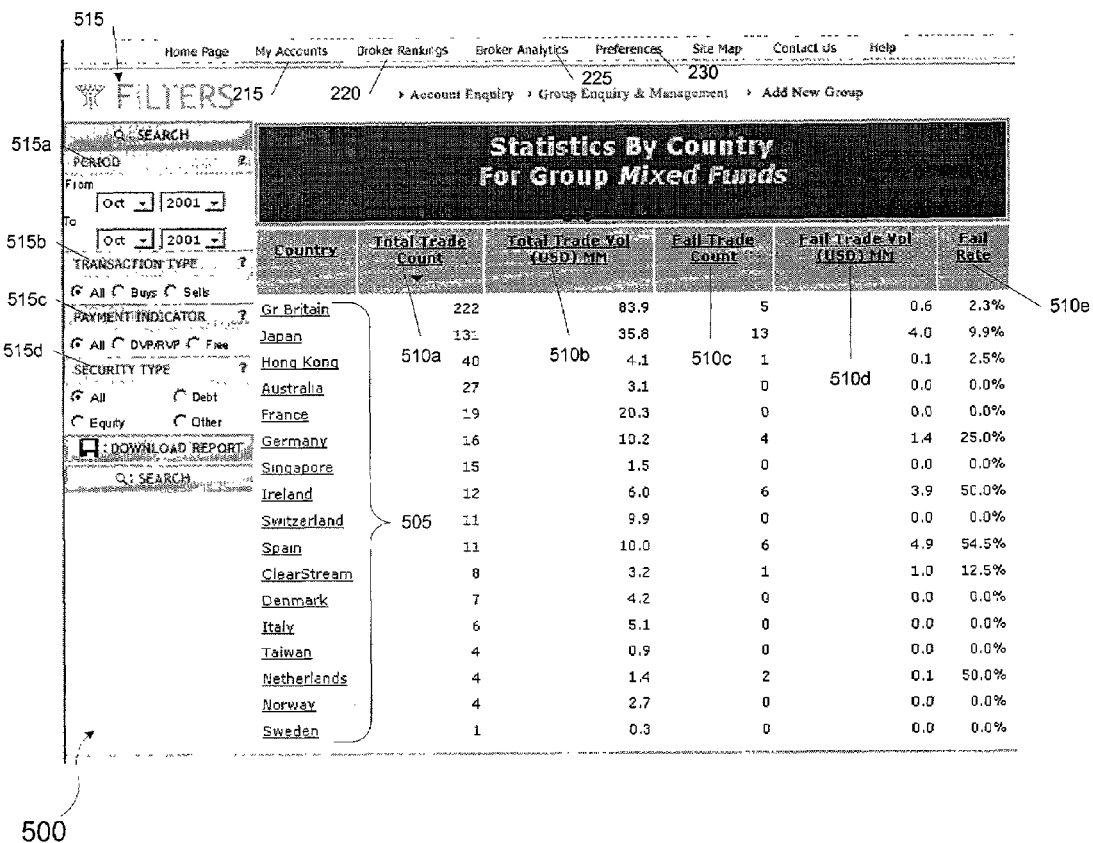
FIG. 5 depicts a view of the Country Summary screen in accordance with an exemplary embodiment of the present invention.

FIG. 5 depicts the Country Summary screen in accordance with an exemplary embodiment of the present invention. The country summary lists trade and failed trade statistics for a user's accounts organized by country. The Country Summary screen 500 looks the same whether the user has arrived at it by way of the Group Enquiry screen 400 or by way of the Account Enquiry screen 300.

By default, the countries listed in the Country Summary screen 500 are sorted in descending order of total trade count. The user may re-sort the countries by selecting any of the column headings corresponding to the statistics displayed, for example, Total Trade Count 510a, Total Trade Vol. (in user-specified currency) 510b, Fail Trade Count 510c, Fail Trade Volume (in user-specified currency) 510d, and Fail Rate 510e. The user may also filter the displayed statistics by selecting various filtering criteria available on the Filter Navigation Bar 515, such as, for example, by time period 515a, by transaction type 515b, by payment indicator 515c, or by security type 515d.

Figure 6:
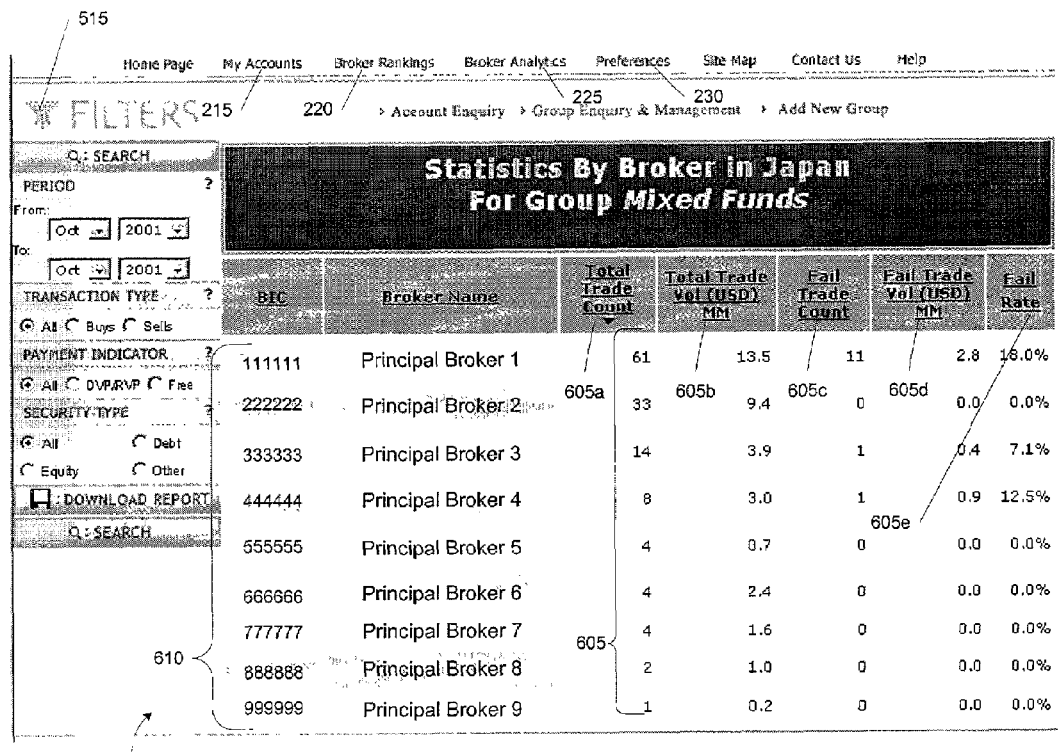
FIG. 6 depicts a view of the Principal Broker Summary screen in accordance with an exemplary embodiment of the present invention.

FIG. 6 depicts a Principal Broker Summary screen in accordance with an exemplary embodiment of the present invention. Selecting any one of the country hyperlinks 505 from the Country Summary screen 500 takes the user to a Principal Broker Summary screen 600, which displays a list of all the Principal Brokers 610 in the selected country that have executed trades on the user's behalf. The Principal Broker Summary screen 600 displays trade and failed trade statistics for each listed Principal Broker 610. The Principal Brokers are listed in descending order by their Total Trade Count 605 statistics. As in the Country Summary screen 500, the user may re-sort the Principal Brokers by a different statistic, by selecting the hyperlinks 605a, 605b, 605c, 605d, and 605e that correspond to the desired statistic. The trade and failed trade data displayed in the Principal Broker Summary screen 600 is dynamically generated in response to changes in the user's selection of filtering criteria contained in the Filter Navigation Bar 515.

Figure 7:
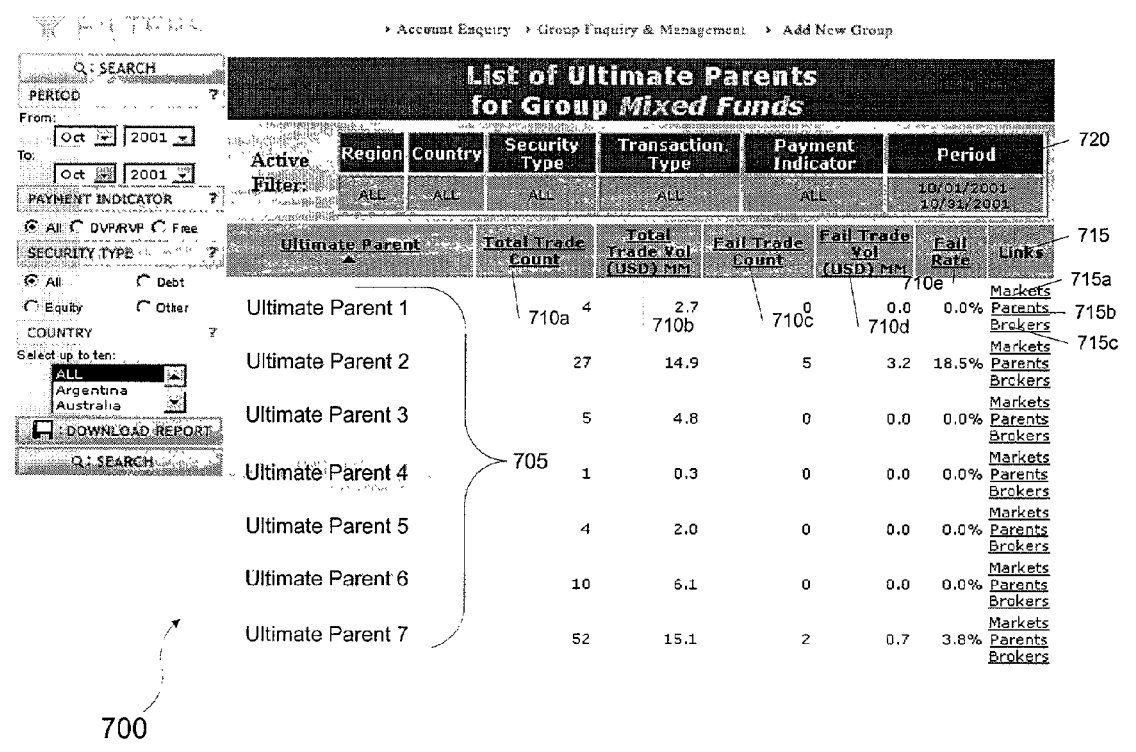

As was previously mentioned, at the Group Enquiry screen 400 the user may choose to view a summary of trade and settlement statistics at the Ultimate Parent or Parent level by selecting the Ultimate Parent Broker hyperlink 435 or the Parent Broker hyperlink 440 respectively. FIG. 7 depicts an Ultimate Parent Summary screen in accordance with an exemplary embodiment of the present invention.

The Parent Summary screen (not shown), is displayed in the same format as the Ultimate Parent Summary screen 700. A list of all the Ultimate Parents 705 that performed trades for the selected user accounts (or group of accounts) is displayed, sorted in alphabetical order by default. Trade and failed trade statistics for each respective broker are listed in columns 710a-e, preferably including: Total Trade Count 710a, Total Trade Volume (in user-selected currency) 710b, Fail Trade Count 710c, Fail Trade Count Vol. (in user-selected currency) 710d, and Fail Rate 710e. Selecting a column heading 710a-e causes the list of Ultimate Parents 705 to be re-sorted in terms of the selected column's set of statistics.

Column 715 includes, for each Ultimate Parent broker, a Markets hyperlink 715a, a Parents hyperlink 715b, and a Brokers hyperlink 715c. Selecting the Markets hyperlink 715a for an Ultimate Parent displays a Country Summary Screen 500 that lists the countries where the Ultimate Parent traded on behalf of the user's selected custody accounts. Selecting the Parents hyperlink 715b or the Brokers hyperlink 715c will cause trade and settlement data to be displayed for each of an Ultimate Parent's constituent members that performed trades on behalf of the user's selected custody accounts. Additionally, the Ultimate Parent Summary screen 700 includes an Active Filter Bar 720, that informs the user what filtering is being applied.

Figure 8:
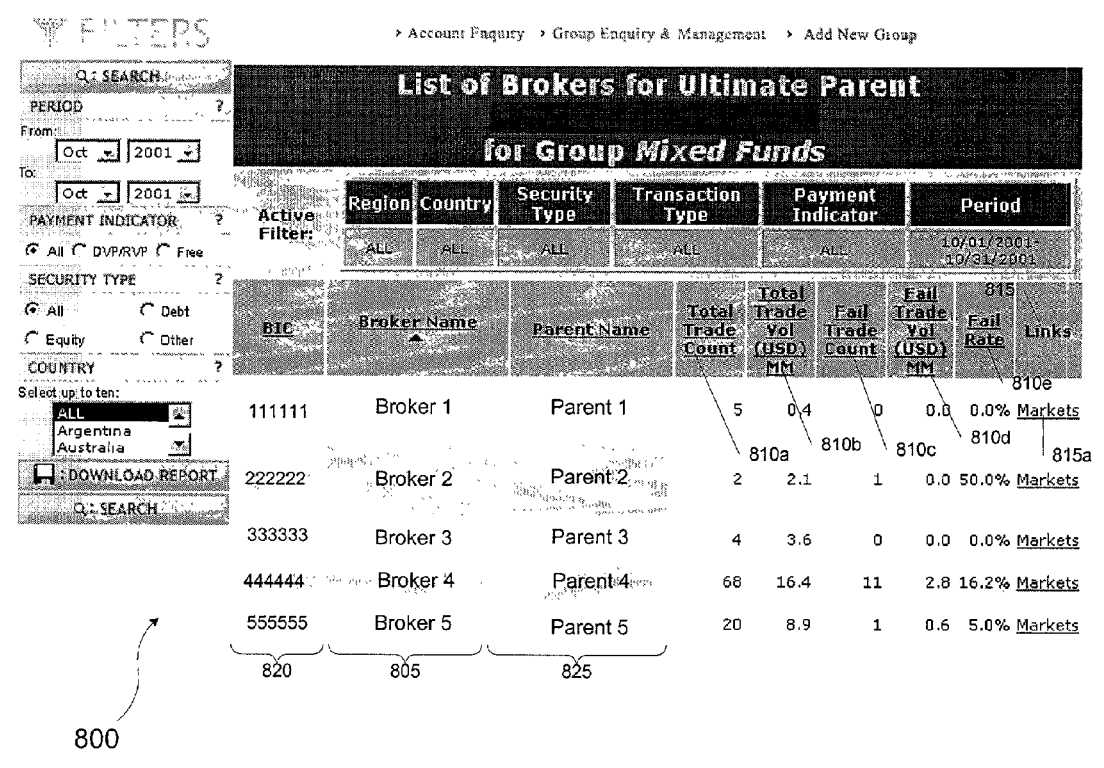

FIG. 8 depicts a screen containing a list of brokers in accordance with an exemplary embodiment of the present invention. Selecting the Brokers hyperlink 715c brings up a List of Brokers screen 800. The List of Brokers screen 800 lists the Principal Brokers 805 and, their corresponding BICs (Broker Identification Codes) in column 820 and names of their respective Parents 825. Columns 810a-e contain trade and failed trade statistics for each respective broker, preferably including: Total Trade Count 810a, Total Trade Volume (in user-selected currency) 810b, Fail Trade Count 810c, Fail Trade Count Vol. (in user-selected currency) 810d, and Fail Rate 810e. The list of Broker Names 805 may be re-sorted by any displayed category of statistic by selecting the column headings 810a-e corresponding to the desired statistic.

Figure 9:
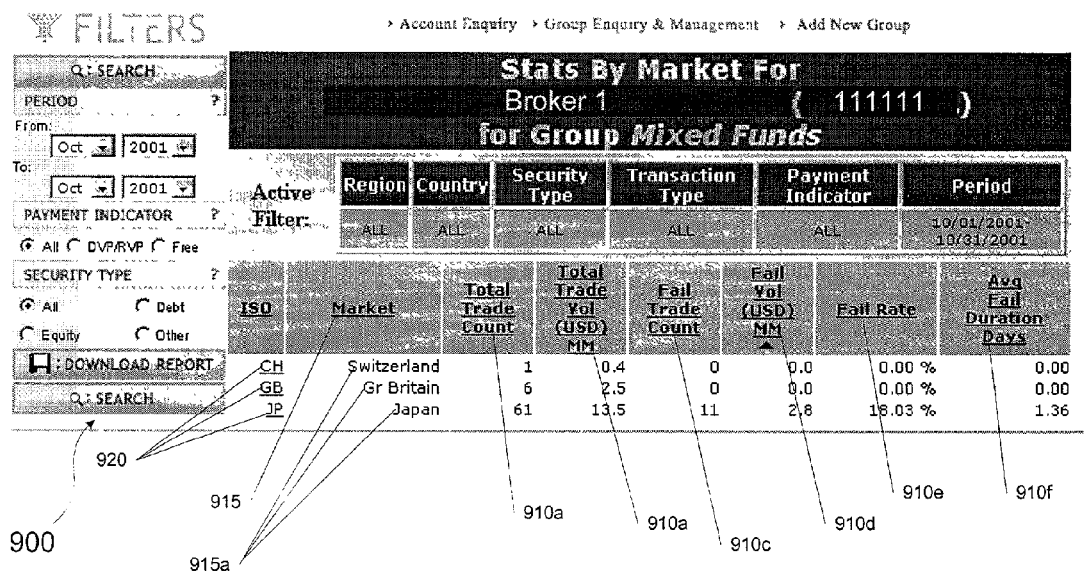
FIG. 9 depicts a view of a Statistics by Market for Principal Broker screen in accordance with an exemplary embodiment of the present invention.

A links column 815 provides a Markets hyperlink 815a that links to a screen that displays trade and failed trade statistics, organized by country, for each Broker Name. This Statistics by Market for Principal Broker screen 900 is depicted in FIG. 9 in accordance with an exemplary embodiment of the present invention. Screen 900 includes columns of statistics organized by Market 915, preferably including: Total Trade Count 910a, Total Trade Volume (in user-selected currency) 910b, Fail Trade Count 910*c*, Fail Trade Count Vol. (in user-selected currency) 910*d*, Fail Rate 910*e*, and Average Fail Duration (in days) 910*f*.

Figure 10:
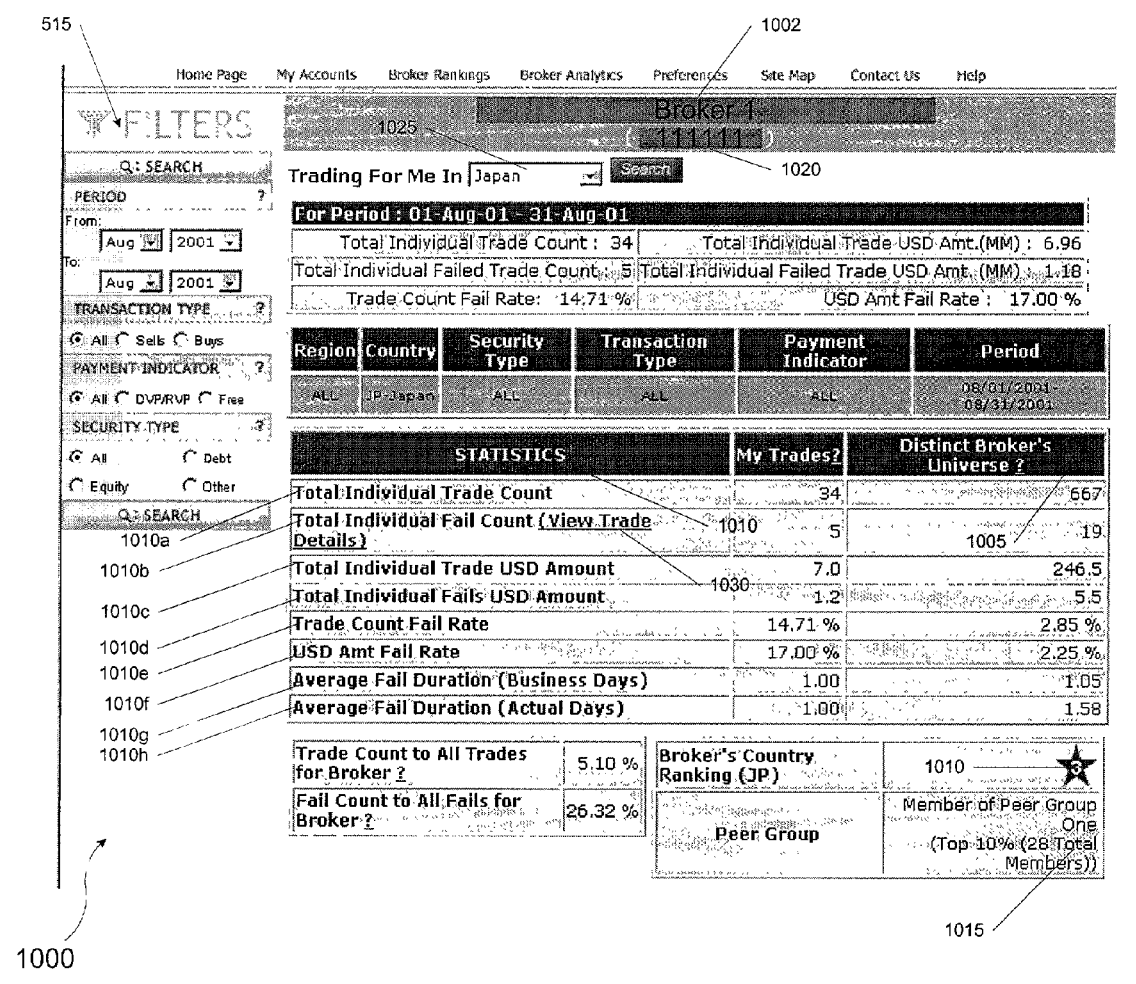

Each ISO country code 920 corresponds to a Market 915*a*, and is preferably a hyperlink to a User-Specific Broker Analytics Screen 1000, depicted in FIG. 10 in accordance with an exemplary embodiment of the present invention. A User-Specific Broker Analytics Screen 1000 can also be accessed by clicking on any of the hyperlinked BICs 610 in FIG. 6. Screen 1000 displays settlement performance statistics and ranking data for the individual broker named in the Broker Name portion 1002, organized by the market specified in a market drop-down box 1025. The broker-specific Statistics Column 1010 preferably lists the following metrics: Total Individual Trade Count 1010*a*; Total Individual Fail Count 1010*b*; Total Individual Trade Amount (in user-specified currency) 1010*c*; Total Individual Fails Amount (in user-specified currency) 1010*d*; Trade Count Fail Rate 1010*e*; Amount Fail Rate (in user-specified currency) 1010*f*; Average Fail Duration in Business Days 1010*g*; and Average Fail Duration in Actual Days 1010*h*. Each metric 1010*a-h* has two statistics associated with it. The first statistic, located in the My Trades column 1035, describes the broker's performance for the user's trades with that broker in the market specified in drop-down box 1025. The second statistic, located under the Distinct Broker's Universe column 1005, describes the broker's performance in aggregate for the market specified in drop-down box 1025. To view My Trades 1035 and Distinct Broker Universe 1005 statistics for a different market, the user may select a different country using the market drop-down box 1025.

At the bottom right portion of the User-Specific Broker Analytics screen 1000, the broker's composite ranking 1010 in the market is displayed. As was previously described, the broker's composite ranking 1010 is relative to any filtering the user has applied using Filter Navigation Bar 515, and is also a function of the peer group settings specified in the User Preferences screen 200. Peer Group box 1015 displays the peer group that the broker falls within, and the number of members in the peer group.

At the top of User-Specific Broker Analytics screen 1000, underneath the broker's name 1002, there is a broker's BIC hyperlink 1020. From here, the user may link through to the particular broker's Broker Analytics screen (depicted in FIGS. 18 and 19 and discussed more fully below).

FIG. 11 depicts a Fail Trade Summary screen in accordance with an exemplary embodiment of the present invention. A user may access the Fail Trade Summary screen 1100 by selecting the View Trade Details hyperlink 1030 from the User-Specific Broker Analytics screen 1000. The Fail Trade Summary screen 1100 displays certain information about the specific failed trades attributed to the broker. The information contained in the Fail Trade Summary screen 1100 is driven by fail codes which are populated in the industry-standard SWIFT trade instructions used by agent banks in markets around the world. The Application uses the SWIFT fail codes to determine whether the broker was at fault for a trade failure. Where the SWIFT code indicates that the broker was not at fault, the Application removes the trade failure from the broker's failed trade count.

The information contained in the Fail Trade Summary screen 1100 preferably includes: the trade's reference number 1105; the custody account number 1110 associated with the trade; the type of transaction 1115; the number of actual days the trade was late 1120; the number of business days the trade was late 1125; a description of the reason the trade failed 1130; a description of the type of security that was to be traded 1135; a description of the number of units that were to be traded 1140; the amount that the failed trade was worth (in user-selected currency) 1145; and the name of the clearer 1150.

Figure 12:
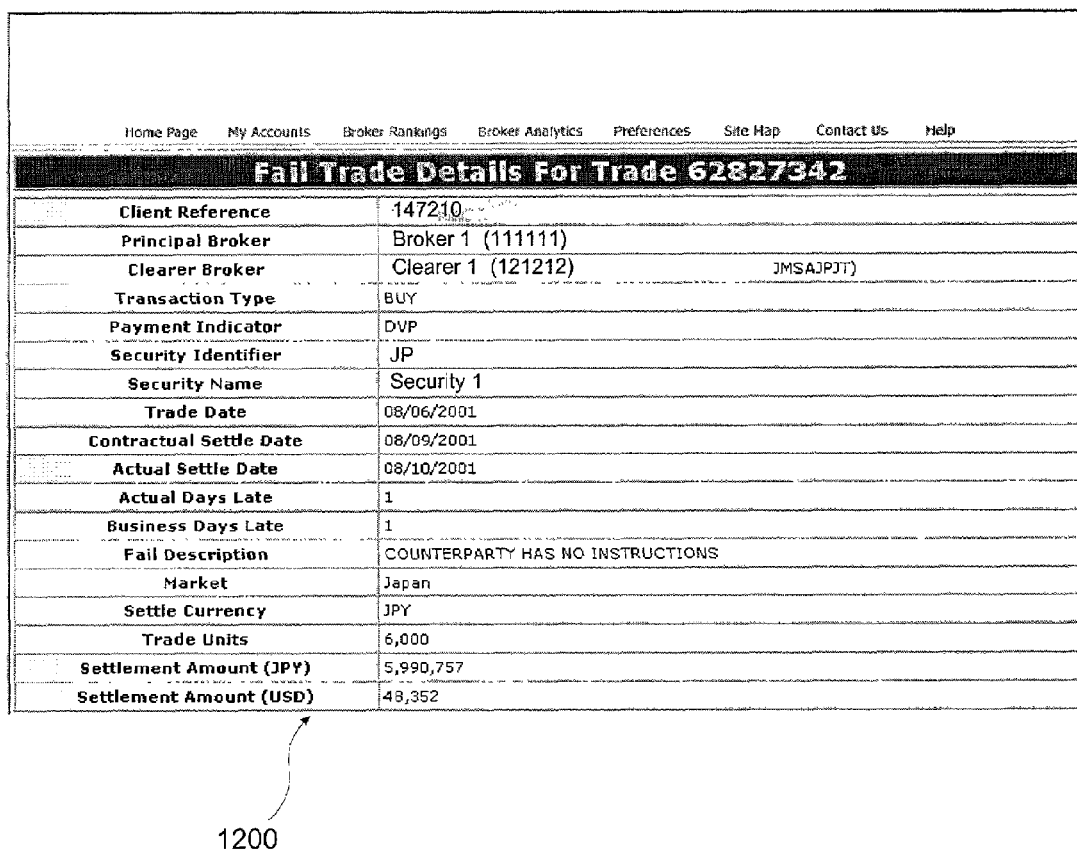
FIG. 12 depicts a view of Fail Trade Details screen in accordance with an exemplary embodiment of the present invention.

The Detail hyperlink 1155 takes the user to the Fail Trade Details screen 1200, depicted in FIG. 12 in accordance with an exemplary embodiment of the present invention. Screen 1200 displays more detailed information about the failed trades listed in the Fail Trade Summary screen 1200. The History hyperlink 1160 links to the Fail Reason History screen, which is depicted in FIG. 13 in accordance with an exemplary embodiment of the present invention, and displays, for each failed trade the date 1305 and reason 1310 for each fail indication received by the Application.

Figure 14:
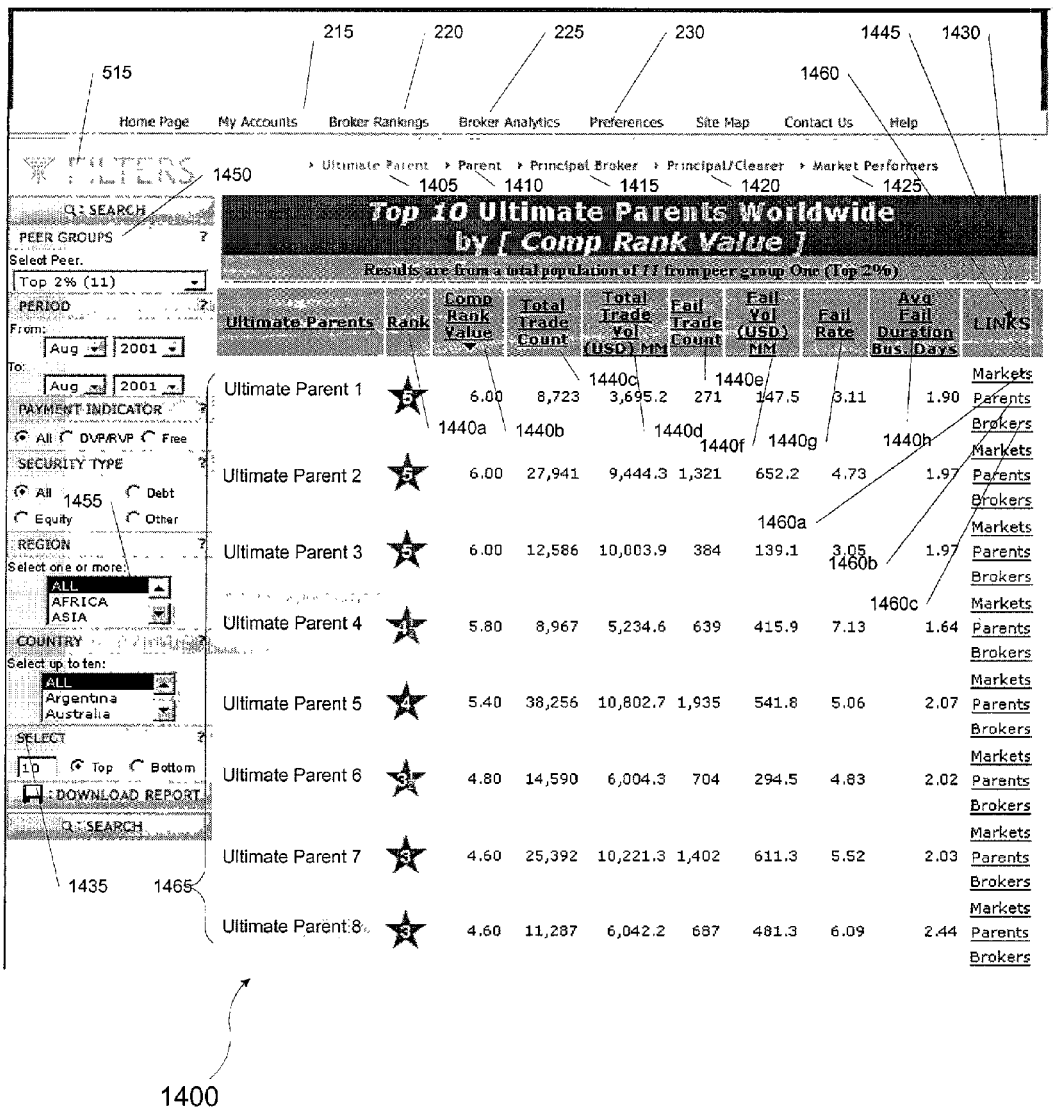
FIG. 14 depicts a view of an Ultimate Parent Rankings screen, in accordance with an exemplary embodiment of the present invention.

Up until now, the focus has been on describing those screens available from within the My Accounts view of the Application. The Broker Rankings view will now be described. FIG. 14 depicts a screen from within the Broker Rankings view in accordance with an exemplary embodiment of the present invention. The screens available from the Broker Rankings view are all the same in appearance and layout. As an example, FIG. 14 depicts the Ultimate Parent Ranking screen, which is displayed by default if the Broker Rankings hyperlink 220, is selected.

The results returned will be the top n brokers worldwide within Peer Group One as defined by the user in textbox 250*a* in the User Preferences screen 200 (see FIG. 2). The user has the ability to view ranking tables at any level of the broker hierarchy simply by clicking on the respective hyperlinks entitled Ultimate Parent 1405, Parent 1410, Principal Broker 1415, Principal/Clearer 1420 or Market Performers 1425. Furthermore, the data can be filtered dynamically using the Filter Navigation Bar 515 in order to affect the relative rankings of the brokers; the rankings are entirely contingent upon the criteria the user has chosen to be relevant in their analysis or assessment.

The ranking table header 1430 specifies the quantity of records (brokers) returned in the table as well as in what order they are listed—'Top' indicating the relative best and 'Bottom' indicating the relative worst. The quantity and order may also be controlled using the Select box 1435 of the Filter Navigation Bar 515.

In alternative embodiments the ranking table header 1430 may also supply the user with other information pertaining to the record set he is viewing. For example, the header may display the hierarchy level for which the rankings are displayed as well as for what location(s) the rankings are relevant. The header may also tells the user by what criteria the statistics in the ranking table are sorted.

The ranked results may be re-sorted by any of the trade statistics column headings 1440*a* through 1440*h*. If the user clicks once on a trade statistics column heading 1440*a* through 1440*h*, the results are ranked from best to worst. If the user clicks a trade statistics column heading 1440*a* through 1440*h* a second time, the results are then re-sorted in the reverse order.

Just below the header in box 1445, the user is given information about the peer group for which he is viewing the rankings. Since the ranking tables are displayed for one peer group at a time, the user has the ability to toggle between peer groups by using the peer group drop-down box 1450 in the Filter Navigation Bar 515. The drop-down shows the percentile bands that the user has specified in Preferences and also lists the number of brokers that fall within each percentile band for the peer groups.

Depending on which level of the hierarchy the user is viewing a ranking table for, there may be differences in how data may be filtered. For example, the Ultimate Parents and Parents levels, a region filtering criterion 1455 is available in the Filter Navigation Tool Bar 515 whereby the user may filter by region. Furthermore, at Ultimate Parent and Parent levels, the user has the ability to view broker rankings across all markets, effectively viewing a worldwide ranking for trade settlement performance.

Within the ranking tables, for each row in the table which represents a unique ultimate parent, parent, principal broker, or principal/clearer pair, the user has several options in terms of linking to different pages. There are several potential hyperlinks in the "Links" column 1460 of the broker ranking table, depending on the level of the hierarchy for which the table is displayed. The potential links are Markets 1460a, Parents 1460b, and Brokers 1460c. In the ranking table, each broker's name 1465 is also a hyperlink that will take the user to another screen. All of these hyperlinks take the user to the Broker Analytics component (discussed in greater detail below).

Figure 15:
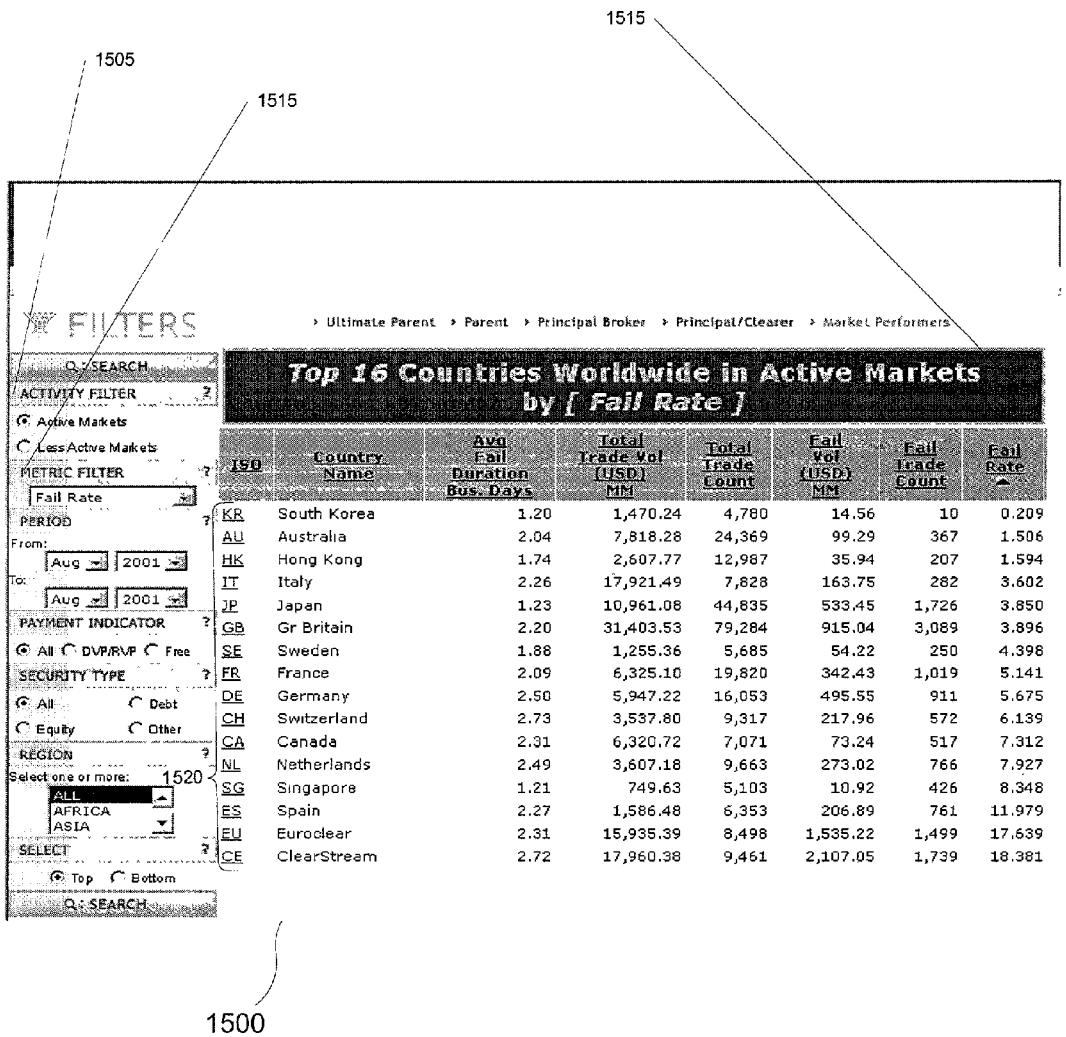
FIG. 15 depicts a Market Performers screen in accordance with an exemplary embodiment of the present invention.

FIG. 15 depicts the Market Performers screen in accordance with an exemplary embodiment of the present invention. The Market Performers screen 1000, which is accessible from the Market Performers hyperlink 1525, displays an aggregate of a month's worth of trade data, at the country level, within the Application's database. Using the Market Performers screen 1500, the user may assess operational risk concerning trade settlement performance at a macro level within a given market. The layout of the Market Performers screen 1500 is similar to that of the Ultimate Parent Level Rankings screen 1400. In one embodiment, the Filter Navigation Bar 515 may differ slightly in that the user may be offered greater, or fewer, filtering options.

For example, in FIG. 15, the Filter Navigation Bar 515 for the Market Performers screen 1500 does not include the peer group drop-down box 1450 shown in FIG. 14 in connection with the Ultimate Parent Level Rankings screen 1400. But the Filter Navigation Bar 515 for the Market Performers screen 1500 shows two additional filters: the activity filter 1505 and the metric filter 1510.

The activity filter 1505 allows the user to restrict the market performer result set to either active or less active markets. The activity is determined by trade count whereby active markets are the top quartile of markets and less active markets represent the lower seventy-five percent. The quantity of countries that will be returned is a maximum of twenty from each group, both active and less active.

The metric filter 1510 is a drop-down box which contains a small set of criteria that the user may select to view the representative list of best or worst performing markets. Similar to the ranking tables 1400, the table headings 1515 indicate active or less active markets, and the metric filter 1510 selected will be displayed in brackets in the heading 1515 as well. In the Market Performers list, each of the countries' ISO codes 1520 is hyperlinked. When the user selects one of the ISO codes 1520, the user is transferred to a ranking table for the best principal brokers in that respective market. The displayed "market performers" will be the relative best brokers from peer group one in light of the user's peer group settings and any filtering the user has selected for the data.

Finally, the Broker Analytics view will be discussed. The Broker Analytics view allows the user to access all of the underlying trade statistics and metrics for every broker within the Application. All of the other components previously of the Application are linked to the Broker Analytics component. By selecting the Broker Analytics hyperlink 220 in the top menu bar of any page in the Application, however, the user may search the Application's database for a particular broker's analytics or underlying trade settlement performance data.

Figure 16:
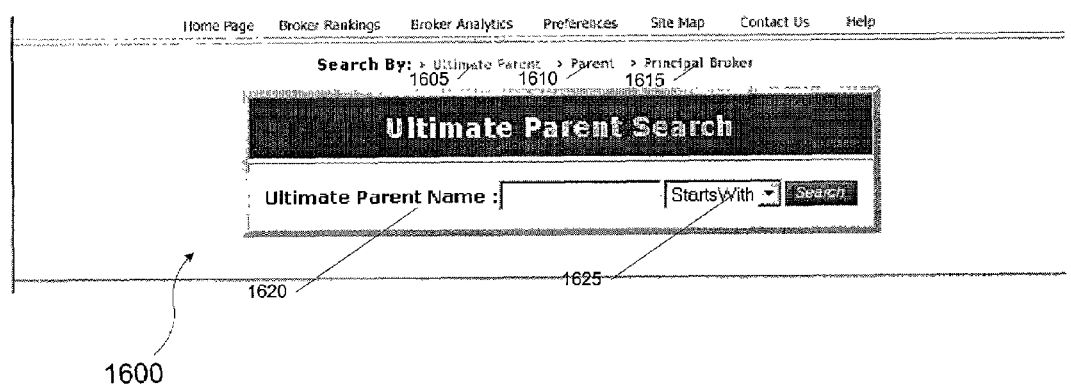
FIG. 16 depicts an Ultimate Parent Search screen in accordance with an exemplary embodiment of the present invention.

FIG. 16 depicts the Ultimate Parent Search screen in accordance with an exemplary embodiment of the present invention. Selecting the Broker Analytics hyperlink 220, directs the user to the Ultimate Parent Search screen 1600 by default. There are three submenu search items within Broker Analytics: Ultimate Parent 1605; Parent 1610; and Principal Broker 1615. Each submenu search item 1605, 1610 and 1615 directs the user to a search function for each respective level in the Broker Analytics hierarchy.

The Ultimate Parent search box 1620 enables the user to search the Application's database using ether a partial or full spelling of an Ultimate Parent's name. The user has the option of selecting "Starts With" or "Contains" in the adjoining drop-down box 1625 to assist in searching. The functionality of the Parent search is the same as that for the Ultimate Parent search.

Figure 17:
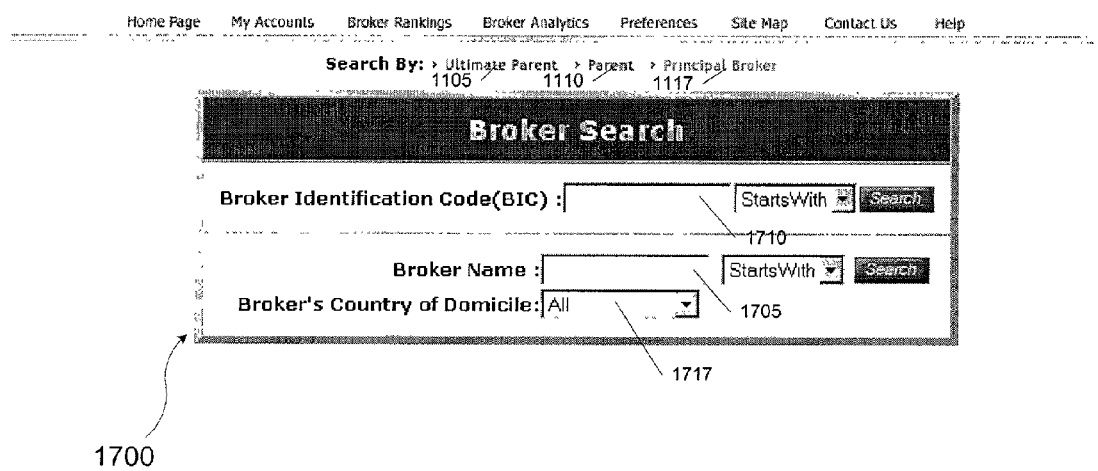
FIG. 17 depicts a Broker Search screen in accordance with an exemplary embodiment of the present invention.

FIG. 17 depicts a Principal Broker search screen in accordance with an exemplary embodiment of the present invention. The Principal Broker search box 1700 allows the user to perform a more directed search. The Principal Broker level is much more granular compared to the Ultimate Parent and Parent levels within the hierarchy. All trade data in the Application's data universe includes a BIC on the trade instructions. Thus, in addition to allowing the user to search for Principal Brokers by name using textbox 1705, the user may search for brokers by BIC or by a partial BIC using textbox 1710. If the user chooses to search by name, he may further narrow his search by also specifying the domicile of the Principal Broker using domicile drop-down box 1715.

Figure 18:
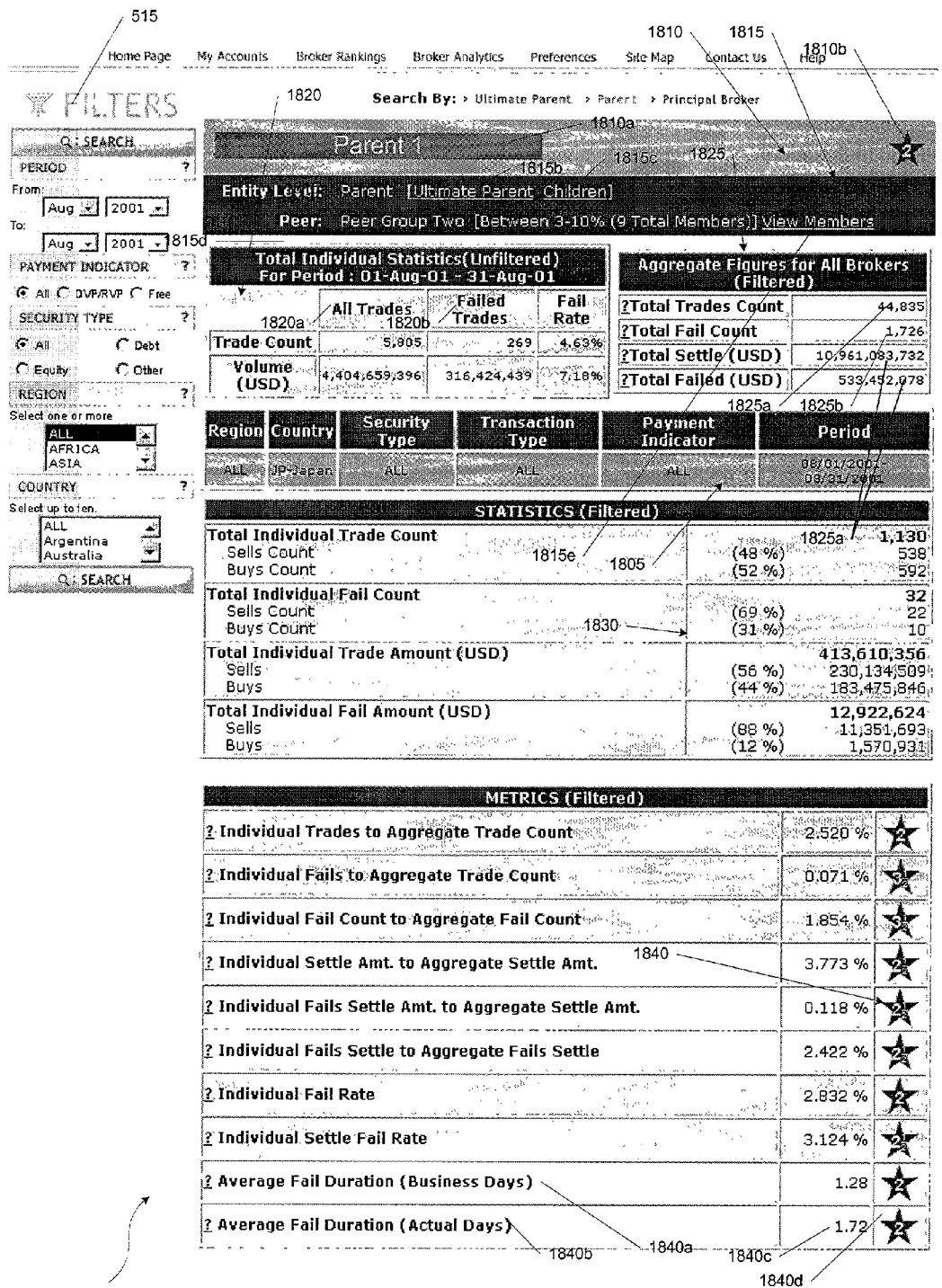
FIG. 18 depicts a Parent Broker Analytics screen in accordance with an exemplary embodiment of the present invention.

FIG. 18 depicts a Broker Analytics screen in accordance with an exemplary embodiment of the present invention. As was previously mentioned in connection with the description of screen 1400 in FIG. 14, the user may jump from any broker rankings screen 1400 directly to the respective Ultimate Parent, Parent, or Principal Broker's analytics screen by selecting any of the hyperlinked Ultimate Parent or Parent names, or a Principal Brokers BIC corresponding to 1465 respectively. In such a case, all filtering done with the ranking table will carry forward to the Broker Analytics screen 1800. As may be seen from FIG. 18, the user may determine what filtering options are currently being applied to the data displayed on the Broker Analytics screen 1800 by examining the Filter Navigation Bar 515 bar to see which radio buttons remain selected. Additionally, the Broker Analytics screen 1800 includes an Active Filter Bar 1805, that informs the user what filtering is being applied.

The top box 1810 of the Broker Analytics screen 1800 lists the broker's name 1810a and the relative ranking 1810b for the broker, given the peer group and any filtering that has been applied. Below the broker's name 1810a is an Entity Level/Peer box 1815 that supplies the user with information that puts the broker's size and relative rank in context. First, the user is reminded by the hierarchy entity level indicator 1815a of the level in the hierarchy that they are viewing. In the example shown in FIG. 18, the analytics are for the parent entity Parent1 . To the right of the hierarchy entity level indicator 1815a, are hyperlinks 1815b and 1815c that enable the user to drill up or down in the hierarchy to see the comparable analytics page for the Ultimate Parent and Children (Principal Broker BICs) of Parent1.

Below the hierarchy entity level indicator 1815a is a peer group indicator 1815d, by which the user is informed about the peer group the particular broker lies within, and the number of members in that peer group. For example, FIG. 18 shows the user that Parent1 is in Peer Group Two [Between 3-10% (9 Total Members)]. This specific peer grouping is dependent on the time period and other filtering on the database shown in the Filter Navigation Bar 515 and in the Active Filter Bar 1805.

To view the ranking table for the specific broker relative to its peers, the user may click on the View Members hyperlink 1815*e*. The Application will then display the ranking table for that broker's peer group, taking into account all selected filtering criteria.

Below the headers 1810 and 1815 are two boxes with trade statistics. The Total Individual Statistics box 1820 shows the unfiltered trade counts 1820*a*, fail counts 1820*b*, and fail rate 1820*c* for the broker across all markets given the time period filter specified. The respective filtered trade statistics appear below the active filter bar in the Filtered Trade Statistics box 1830. The Aggregate Figures for All Brokers box 1825 shows the trade count 1825*a* and fail count 1825*b* and monetary volumes 1825*c* for all brokers.

The aggregate figures in box 1825 are dynamic and reflect whatever filtering parameters the user has specified. The figures in box 1825 are representative of the entire broker population given the filtering criteria; the numbers are not solely representative of the peer group within which specific broker in question falls.

Displayed below the Active Filter Bar 1805 are all of the filtered statistics and calculated metrics for the broker. The first group of numbers is the Filtered Trade Statistics box 1830, which is a pure representation of the numbers as they exist in the Application's database. The second group of figures is the Calculated Metrics Box 1840, which relates attributes about the broker's trade settlement performance and size in the market within the Application's universe. The metrics are mainly derived as ratios of the broker's individual filtered statistics compared to the aggregate trade statistics.

There are also two metrics 1840*a* and 1840*b* called Average Fail Duration, one for business days 1840*a* and another for calendar days 1840*b*, which are indicative of the broker's timely resolution of failing trades. The figures for each calculated metric are listed in a column 1840*c* and next to that column is also a relative ranking 1840*d* for each of the individual metrics. These rankings are all relative to the broker's peer group and any filtering criteria chosen by the user. A subset of these metrics rankings are used to calculate a composite rank value which is then used to calculate the broker's overall ranking 1810*b*.

Figure 19:
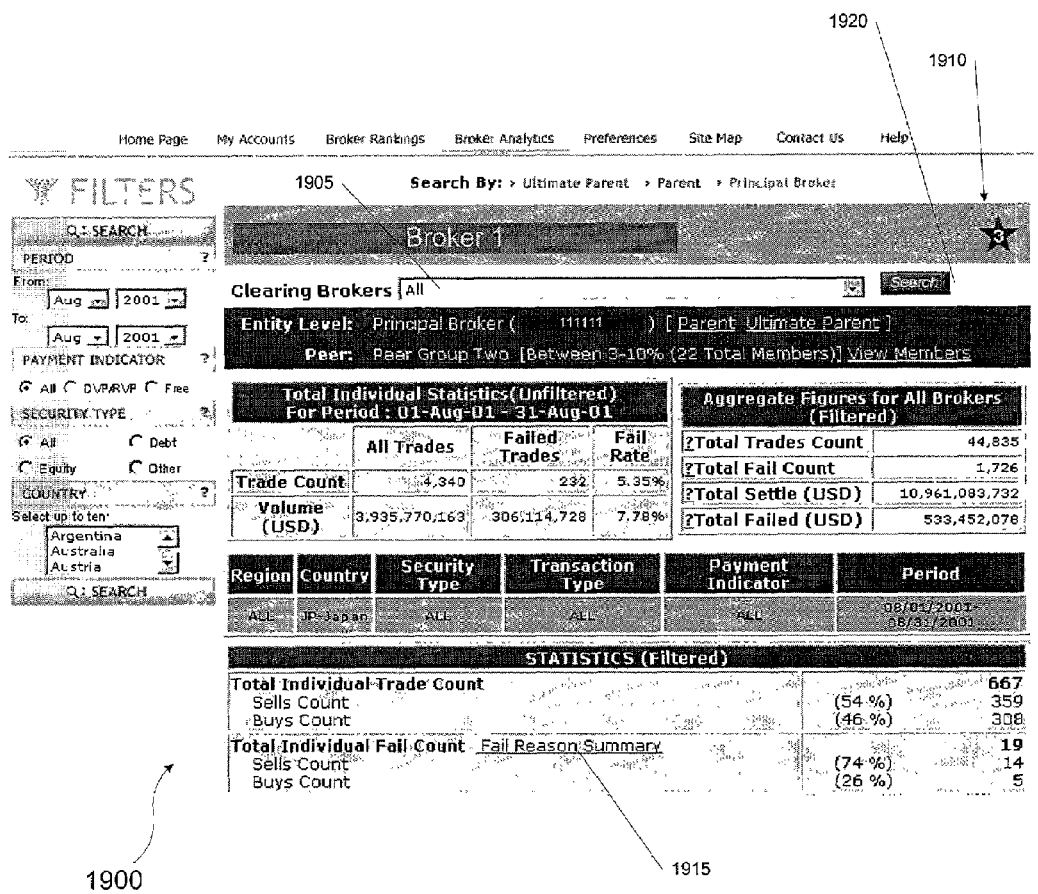
FIG. 19 depicts a Principal Broker Analytics screen in accordance with an exemplary embodiment of the present invention.

FIG. 19 depicts a Principal Broker Analytics screen, in accordance with an exemplary embodiment of the present invention. When the user views the underlying Principal Broker Analytics screen 1900, a drop-down box 1905 appears below the name header 1910. The drop-down box 1905 lists all the clearing brokers that the specific principal broker uses in the specified market. Each clearer name listed represents a unique BIC.

From the Principal Broker Analytics screen 1900, users have the ability to select a Fail Reason Summary hyperlink 1915 that provides a root cause summary for the broker's respective failed trades. FIG. 20 depicts a Fail Reason Summary screen in accordance with an exemplary embodiment of the present invention. As was previously discussed in connection with FIG. 11, the Fail Reason Summary 2000 is driven by the fail codes which are populated in the SWIFT trade instructions. Any nondescript fail codes are labeled "Unspecified" as no further details are available.

Within the Principal Broker Analytics screen 1900, if the user selects the search button 1920 next to the Clearing Broker drop-down box 1905, a broker analytics screen for the distinct Principal/Clearer combination will be displayed. FIG. 21 depicts a Principal/Clearer Broker Analytics screen in accordance with an exemplary embodiment of the present invention. The general layout for the Principal/Clearer Broker Analytics screen 2100 is similar to the Principal Broker Analytics screen 1900, except that there is additional information added to the trade statistics as well as to the calculated metrics. This additional information pertains to the quantity and ratio of trades that the specific clearing broker handled for the principal broker as opposed to considering solely the principal broker's activity in the market independent of the clearers used.

The filtered trade statistics preferably include three additional columns 2105, 2110, and 2115. The Principal Only column 2105 displays the trade statistics for the principal broker independent of the clearer used. The Principal/Clearer column 2110 contains the trade statistics for the distinct principal/clearer pair. The Ratio column 2115 lists the ratios for the specific clearer's contribution towards the overall principal broker's trade statistics.

There are also an additional two columns in the lower half of the Principal/Clearer Broker Analytics screen 2100: the Principal/Clearer Combo's Metrics column 2120, and the Principal/Clearer Ranking column 2125. For each of the individual calculated metrics, the statistics and relative ranking are still displayed for the principal broker in column 2130, independent of clearers used. However, the distinct principal/clearing combination's trade statistics are displayed in column 2120 and the relative ranking is displayed in column 2125 relative to the Principal/Clearer combination's own peer group. As such, the relative ranking of the Principal/Clearer combinations has no direct relation to the relative ranking of the Principal brokers, since the trade statistics and metrics are different and the peer groupings are distinct as well.

Although the present invention has been described in relation to particular embodiments thereof, many other variations and modifications and other uses will become apparent to those skilled in the art. For example, the present invention for evaluating trading entities on the basis of settlement performance can be combined with other trading entity evaluation tools such as research and trade execution evaluators. It is preferred, therefore, that the present invention be limited not by the specific disclosure herein, but only by the appended claims.

What is claimed is:

1. A computer system for recording the actions and ranking the failed trade settlement performance of broker/dealer participants in financial trades comprising:
   A) a database connected to a communications network, wherein the database stores:
   i) participant identity data uniquely identifying two or more broker/dealer trading participants;
   ii) trade data for recording details of trades in which the trading participants engaged; and
   iii) settlement data describing an actual settlement date on which each of the trades engaged in by each of the trading participants actually settled;
   B) a server connected to the communications network and to the database, wherein the server is programmed to:
   i) retrieve said participant identity, trade and settlement data;
   ii) for each participant, perform a first filter of the settlement data to identify which of the trades included in that participant's trade data is a failed trade settlement, wherein a failed trade settlement is a trade that actually settles on a date beyond an established settlement date by which the trade should have been settled wherein the first filter is based on a period over which a user wished to view trade and settlement data;

iii) perform a second filter to determine performance of a plurality of trading participants in accordance with their failed trade settlements pursuant to one or more criteria selectable by the user, wherein the user selectable filtering criteria includes one or more criteria selected from the group comprised of:
a) a time period;
b) a transaction type;
c) a payment type;
d) a security type;
e) a geographic region; and
f) a country;

iv) select a plurality of trading participants to evaluate;

v) display second filtered data for the selected plurality of trading participants to the user; at least one display displaying the performance of the selected plurality of trading participants in rank order based on second filter results and on a market complexity factor wherein the rank order is based on a star score comprising one-half to five stars derived from the plurality of trading participants percentile within the second filter results of the trade and settlement data;

vi) display to the user failed trade settlement data for the selected plurality of trading participants; and C) one or more workstations operatively connected to the communication network, wherein each workstation provides access to the server to view the first and second filtered failed trade data in accordance with criteria selected by the user.

2. The computer system in accordance with claim 1 wherein the server is programmed to rank the selected plurality of participants by best to worst failed trade performance.

3. The computer system in accordance with claim 2 wherein the server is programmed to communicate the failed trade rankings of said selected plurality participants to one or more entities that have access rights to the computer system.

4. The computer system in accordance with claim 1 wherein the server is programmed for counting total trades by the plurality of participants for ranking at least said selected plurality of participants in terms of one or more metrics selected from the group comprising:
a) a selected participant's individual total failed trades count as compared to an aggregate total trade count for the plurality of participants;
b) a selected participant's individual total failed trade count as compared to an aggregate total failed trade count for the plurality of participants;
c) a selected participant's individual total failed trade count as compared to its individual total trade count;
d) a selected participant's total trade settlement amount as compared to the aggregate total trade settlement amount for the plurality of participants;
e) the aggregate total failed trade settlement amount for the plurality of participants;
f) for the selected plurality of participants' failed trades, the average number of days past the settlement date that the trades actually settled.

5. The computer system in accordance with claim 1 wherein the server is further programmed to:
compute a plurality of core failed trade metrics for the plurality of trading participants; and
rank the selected trading participants according to a (a) selected trade metric or (b) composite failed trade metric based on multiple core failed trade metrics.

6. The computer system in accordance with claim 1 wherein the market complexity factor is an efficiency ratio that is calculated by security type for a market in which at least one of trading participants execute and settle trades.

7. The computer system in accordance with claim 6 wherein the server applies the market complexity factor to trade metrics of the trading participants to obtain market complexity figures and applies a formula to the market complexity figures for each of the trading participants to generate a formula result.

8. The computer system in accordance with claim 7 wherein the formula is a weighted average.

9. The computer system in accordance with claim 7 wherein the server generates the rank order based on ordering the formula result for each of the trading participants.

10. The computer system in accordance with claim 6 wherein the efficiency ratio is based on an assessment of a plurality of categories related to an efficiency of trade settlement within the market based on the security type.

11. The computer system in accordance with claim 10 wherein a plurality of categories include two or more of: a trade matching category, a settlement type category, a securities type category, a depository category, a failure provisions category, a trade date/settlement date lapse category, a regulatory oversight category, and a securities legal frame work category.

12. A method using a computer system to derive failed trade settlement data for multiple broker/dealer participants in financial trades, said computer system coupled to a data communications network, a database operatively connected to said network, a server operatively connected to the network and the database; and one or more workstation operatively connected to the server, comprising the computer-implemented steps of:
a) receiving and recording actions and performance including trade data from participants, said trade data including trade orders to the market, acceptance of the trade orders, date of closing and the dates when such orders are actually settled;
b) extracting failed trade settlements from said trade data, wherein a failed trade settlement is a trade that actually settles beyond an established time when the trade should have settled;
c) analyzing failed trade settlements from said trade data at four distinct levels wherein the four distinct levels comprise the following: ultimate parent, parent, principal broker, and principal/clearer combination whereby the four distinct levels are hierarchical;
d) recording said failed trade settlements for each participant;
e) ranking failed trade settlements by each participant based on a market complexity factor whereby the market complexity factor is applied when trade data is across more than one market wherein the market complexity factor is an efficiency ratio that is calculated by security type for the market in which at least one of trading participants execute and settle trades,
f) ranking failed trade settlement performance for a plurality of participants based on user selectable filter criteria wherein the user selectable filtering criteria comprises a first and second filtering step whereby the first filtering step is based on time over which a user wishes to view data and the second filtering step comprises one or more of the following criteria:
a) a time period;
b) a transaction type;
c) a payment type;

d) a security type;
e) a geographic region;
f) a country; and
g) displaying to a user failed trade settlement rank data for a selected plurality of trading participants.

13. The method in accordance with claim 12 further including aggregating failed trade data for the plurality of participants and ranking two or more selected participants in accordance with best to worst failed trade performance.

14. The method in accordance with claim 13 further including communicating to one or more workstations the ranking of said two or more selected participants to one or more entities that have access rights to that data.

15. The method of programming a computer system to derive failed trade data in accordance with claim 12, further comprising:
computing a plurality of core failed trade metrics for the plurality of trading participants; and
ranking selected trading participants according to a (a) selected trade metric or (b) a composite failed trade metric based on multiple core failed trade metrics.

16. A method comprising the computer-implemented steps of:
identifying a trading participants peer group that comprises a plurality of trading participants wherein the trading participants peer group is a particular subset of brokers from a applicable universe of brokers;
retrieving trade data that comprises details of trades in which each of the plurality of trading participants engaged;
retrieving planned settlement data describing a planned settlement date on which each of the trades engaged in by each of the trading participants was planned to settle;
retrieving actual settlement data describing an actual settlement date on which each of the trades engaged in by each of the trading participants actually settled;
performing a first filter of the actual settlement data and of the planned settlement data to identify any failed trade settlements for each of the plurality of trading participants, wherein a failed trade settlement is a trade where the actual settlement date is after the planned settlement date wherein the first filter criteria is a period over which the actual settlement data is to be viewed;
performing a second filter on the trade data that outputs filtered trade data indicating a performance of the plurality of trading participants pursuant to one or more user selectable criteria, wherein the user selectable criteria includes one or more of:
a) a time period,
b) a transaction type,
c) a payment type,
d) a security type,
e) a geographic region, and
f) a country;
analyzing the filtered trade data for the plurality of trading participants at four distinct levels wherein the four distinct levels comprise the following: ultimate parent, parent, principal broker, and principal/clearer combination whereby the four distinct levels are hierarchical;
deriving a set of performance metrics associated with the filtered trade data for each of the plurality of trading participants, wherein at least one of the set of performance metrics measures performance individually for each of the plurality of trading participants and at least one of the set of performance metrics measures performance for each of the plurality of trading participants relative to the trading participants peer group wherein the set of performance metrics is applied across the four distinct levels whereby the set of performance metrics comprises at least one of the following:
a) a selected participant's individual total failed trades count as compared to an aggregate total trade count for the plurality of participants;
b) a selected participant's individual total failed trade count as compared to an aggregate total failed trade count for the plurality of participants;
c) a selected participant's individual total failed trade count as compared to its individual total trade count;
d) a selected participant's total trade settlement amount as compared to the aggregate total trade settlement amount for the plurality of participants;
e) the aggregate total failed trade settlement amount for the plurality of participants;
f) for the selected plurality of participants' failed trades, the average number of days past the settlement date that the trades actually settled;
ranking each individual broker within the plurality of trading participants based on each of the at least one of the set of performance metrics wherein the ranking comprises a star score from one-half to five stars depending on a percentile ranking of the individual broker within the set of performance metrics;
generating a composite ranking for each of the plurality of trading participants whereby the composite ranking is generated by taking a simple average of individual rankings for at least the following metrics, comprising: individual trades to aggregate trade count, individual fail count to aggregate fail count, individual fail rate, and average fail duration wherein the composite ranking comprises a star score from one-half to five stars depending on a percentile ranking of the plurality of trading participants within the set of performance metrics; and
ranking the plurality of trading participants across all markets with trade activity at the ultimate parent and parent levels and across any individual market or combination of markets at the principal broker level wherein a market complexity factor is used when trading activity is across more than one market, the market complexity factor being an efficiency ratio that is calculated for a market in which at least one of the trading participants execute and settle trades, wherein the market complexity factor is applied to trade metrics of the at least one of the trading participants to obtain market complexity figures that are included in a weighted average formula to generate a formula result for the at least one of the trading participants, the composite ranking being based on the formula result, wherein the efficiency ratio is based on an assessment of a plurality of categories related to an efficiency of trade settlement within the market, the plurality of categories including two or more of: a trade matching category, a settlement type category, a securities type category, a depository category, a failure provisions category, a trade date/settlement date lapse category, a regulatory oversight category, and a securities legal frame work category, wherein the composite ranking aggregates the plurality of trading participants and ranks two or more selected trading participants in accordance with best to worst failed trade performance.

* * * * *